US006701126B1

(12) United States Patent
Draim

(10) Patent No.: US 6,701,126 B1
(45) Date of Patent: Mar. 2, 2004

(54) SYSTEM AND METHOD FOR IMPLEMENTING A CONSTELLATION OF NON-GEOSTATIONARY SATELLITES THAT DOES NOT INTERFERE WITH THE GEOSTATIONARY SATELLITE RING

(75) Inventor: John E. Draim, Vienna, VA (US)

(73) Assignee: Space Resource International Ltd., Washington, DC (US)

( * ) Notice: Subject to any disclaimer, the term of this patent is extended or adjusted under 35 U.S.C. 154(b) by 470 days.

(21) Appl. No.: 09/709,280

(22) Filed: Nov. 13, 2000

(51) Int. Cl.[7] .......................... H04B 7/185; H04B 7/19; H04Q 7/20
(52) U.S. Cl. ................ 455/13.1; 455/12.1; 455/13.2; 455/427
(58) Field of Search ............................. 455/12.1, 13.1, 455/7, 13.2, 13.3, 427, 428, 429, 430, 403; 342/350, 352, 355

(56) References Cited

U.S. PATENT DOCUMENTS

| 5,845,206 | A | | 12/1998 | Castiel et al. ............... 455/13.4 |
| 6,333,924 | B1 | * | 12/2001 | Porcelli et al. .............. 370/331 |
| 2001/0045494 | A1 | * | 11/2001 | Higgins .................. 244/158 R |
| 2002/0017593 | A1 | * | 2/2002 | Castiel et al. ........... 244/158 R |
| 2002/0160710 | A1 | * | 10/2002 | Castiel et al. ............... 455/12.1 |
| 2002/0177403 | A1 | * | 11/2002 | LaPrade et al. ............ 455/12.1 |

OTHER PUBLICATIONS

Giovanni et al, "Development of the INTELSAT–IX Satellite System", Space Systems/Loral, Palo Alto, CA, Sep. 1997.*
Internet Article from "Online!", <URL:http://www.virgualgeo.com/orbits_plain_print.htm>: "Virtual Geosattellite LLC: Virtual Geosatellite Orbits Better for New Satellite Systems Using the 'K' Frequency Band", Mar. 4, 1999.

* cited by examiner

*Primary Examiner*—Nay Maung
*Assistant Examiner*—Edan Orgad
(74) *Attorney, Agent, or Firm*—Rabin & Berdo, P.C.; Philip G. Avruch

(57) ABSTRACT

Provided is an improved system and method for implementing a constellation of satellites in inclined elliptical orbits. The satellites are operated during the portion of their orbits near apogee to emulate the characteristics of geostationary satellites. The orbits are configured to form a number of closely spaced repeating ground tracks around the earth. In each ground track the satellites operate only in arcs well above or below the equator to provide a large number of non-geostationary orbital slots that substantially increase global satellite capacity without interfering with the existing geostationary satellite ring. Minimum spacing is maintained between satellites in each active arc and between satellites in the active arcs of adjacent ground tracks to ensure that the satellites in the non-geostationary constellation do not interfere with each other.

27 Claims, 15 Drawing Sheets

SYSTEM AND METHOD FOR IMPLEMENTING A CONSTELLATION OF NON-GEOSTATIONARY SATELLITES THAT DOES NOT INTERFERE WITH THE GEOSTATIONARY SATELLITE RING

FIELD OF THE INVENTION

The present invention is generally related to satellite communications systems and, more particularly, to a constellation of non-geostationary satellites that may be deployed and utilized in a manner that substantially increases global communications satellite capacity and does not interfere with the existing geostationary satellite ring.

BACKGROUND OF THE INVENTION

Geostationary ("geo") satellites for telecommunications applications were first proposed many years ago by the author Arthur C. Clark. Today, there are numerous communications systems employing geo satellites for such diverse applications as telephone and data trunking, television distribution, direct-to-home broadcasting, and mobile communications. Geo satellites operate on the physical principle that a satellite, in circular orbit at the proper altitude above the equator, will orbit the earth at the same angular velocity as the earth's rotation. These satellites therefore, appear to be fixed relative to a point on the earth. This characteristic of geo satellites facilitates their use for communications applications by allowing communications terminals on the earth to simply point their antennas at one position in the sky.

There are however, a number of distinct drawbacks associated with geostationary satellite systems. One major drawback is the high cost of raising a satellite into geo orbit. Geostationary orbits have a radius from the earth center of approximately 36,000 kilometers. Typically, a geo satellite is launched first into an elliptical transfer orbit having an apogee at geostationary altitude, and then its orbit is circularized by using a kick motor to impart the necessary addition momentum to the satellite at apogee. The apogee kick motor, before it is fired, typically weighs as much as the satellite itself, meaning that the launch vehicle must initially launch a payload twice as heavy as the satellite in final orbit. Accordingly, the cost of putting a satellite into the high circular orbit required for geostationary operation is significantly greater than for non-geostationary satellites. The cost associated with deployment of satellites must generally be amortized over the lifetime of the satellite, making use of geo satellites more expensive.

Another problem associated with the altitude at which geo satellites orbit is the delay in the round trip transmission to and from the satellite. For a pair of diverse communications terminals located within the coverage area of a geo satellite, the path length from terminal-to-satellite-to terminal is at least 70,000 kilometers. For the average satellite "hop" the associated transmission delay is approximately one-quarter of a second. For voice communications by satellite, the delay may not be noticeable to most users, but does make it necessary to use special circuitry for echo control. For data communications, the delay complicates the use of protocols that are predicated on the characteristics of terrestrial circuits.

Other problems arise from the geometry of coverage of geo satellite systems. A geostationary satellite system intended to provide "global" services would include three geo satellites spaced equal along the equatorial arc at 120-degree intervals. The coverage of each of these satellites describes a circle on the surface of the earth with its center on the equator. At the equator, the coverage areas of two adjacent geo satellites overlap approximately 40 degrees in longitude. However, the overlap decreases as latitude increases, and there are points on the earth, north and south of the coverage areas, from which none of the geo satellites is visible. The lack of coverage is most pronounced at points where the coverage areas intersect, mid-way between satellite orbital locations.

For a geo system, in which the satellites are in orbit above the equator, earth stations in the equatorial regions generally "see" the satellites at high elevation angles above the horizon. However, as the latitude of an earth station location increases, the elevation angle to geo satellites from the earth station decreases. For example, elevation angles from ground stations in the United States to geostationary satellites range from 20 to 50 degrees. Low elevation angles can degrade the satellite communications link in several ways. The significant increase in path length through the atmosphere at low elevation angles exacerbates such effects as rain fading, atmospheric absorption and scintillation. For mobile communications systems in particular, low elevation angles increase link degradation due to blockage and multipath effects.

Because each of the geo satellites only covers one part of the world, some communications links may require more than one satellites hop, or some combined use of satellite and terrestrial transmission facilities to reach their destination. The problem with multiple satellite hops is that for satellites in geostationary orbit, there is a corresponding significant increase in total circuit delay. Of course, multiple satellite hops require an earth station located in view of both satellites that can relay the transmission from one satellite to another.

Direct, inter-satellite links have been proposed as a means for extending the coverage of Geo satellites without the need for such an intermediate earth station. Although the inter-satellite link eliminates the earth station and one round-trip path to the satellite, the benefit is largely offset by the delay incurred in the path between the two orbit satellites. For geo satellites spaced at 120 degrees, the path between satellites is approximately 50,000 kilometers. Moreover, the equipment needed on-board the satellites to implement the inter-satellite link, whether microwave or optical, is complex and expensive. As a result, inter-satellite links have not found extensive application in geo stationary satellites.

Another, and perhaps more significant, problem resulting from the specific geometry of the geo orbit, is the limited availability of orbital positions (or "slots") along the geostationary orbital arc. The ring of geostationary satellites that has grown up over time generally occupies multiple slots spaced two degrees apart and identified by their longitudinal positions. This arrangement has been adopted internationally to allow for satellite communications with a minimum of interference between adjacent satellites operating in the same frequency bands. The two-degree spacing is achieved by using high gain, directional antennas at the ground stations accessing the satellites. The geo ring around the equator thus provides a total of 180 slots (360 degrees/two degrees per slot). Most of the Geo slots are now occupied, making it difficult to find positions for more geo satellites. Frequency, polarization and beam diversity have been used to multiply capacity, but capacity in the geostationary arc remains limited. Moreover, not all geo orbital positions are equally useful or attractive for various applications.

Various non-geostationary satellite systems have been implemented in the past to overcome some of the drawbacks of geo satellites. An example is the Russian Molniya system, which employed satellites in elliptical 12-hour orbits to provide coverage to the northern latitudes in the Soviet Union. The Iridium and Globalstar systems use satellites in low circular orbits to significantly reduce transmission delay. Generally, non-geostationary systems operate in inclined orbits, and pose a potential for interference with satellites operating at the same frequencies as they cross the geo ring.

In January 1999, an application was filed before the Federal Communications Commission (FCC) by Virtual Geosatellite LLC for the construction of a global broadband satellite communications system based on the teachings of U.S. Pat. Nos. 5,845,206 and 5,957,409, issued to the inventor of the present invention and two other individuals on Dec. 21, 1998 and Sep. 28, 1999, respectively. The system proposed in the FCC application employs three arrays of satellites in elliptical orbits, two arrays covering the northern hemisphere and one covering the southern hemisphere, each array having five 8-hour satellites emulating many of the characteristics of geo satellites. The satellites appear to "hang" in the sky because their angular velocity at or near apogee approximates the rotation rate of the earth. Nine so-called "active arcs" are created with centers located at the apogee points of the satellite orbits. The satellites in each of the three arrays move in a repeating ground track from one active arc to the next, so that there is always one active satellite available in each active arc. Satellites are deactivated between arcs. The active arcs occupy a different portion of the sky than any of the geo satellites located near the equator. As a result, the virtual geo satellites are visible from most parts of the northern and southern hemispheres, but do not interfere with satellites in the geo arc. Even with the prior art virtual geo satellite constellation described above, the present inventor recognizes that capacity issues will continue to become more pressing as communication traffic needs, both in terms of bandwidth and capacity, grow. There will be a need for non-geostationary satellite constellations that provide greater capacity than has already been contemplated in the prior art.

OBJECTIVES

Therefore, it is an object of the present invention to provide a system of satellites that substantially increases global communications satellite capacity without interfering with the existing geostationary satellite ring.

It is another objective of the present invention to provide a global system of communications satellites with higher average elevation angles and lower transmission delay than existing geostationary satellites.

It is a further objective of the present invention to provide a global system of communications satellites with lower construction and launch costs than existing geostationary satellites.

It is yet a further objective of the present invention to provide a global system of communications satellites capable of effectively reusing existing geostationary satellite spectrum allocations.

The above-stated objectives, as well as other objectives, features and advantages, of the present invention will become readily apparent from the following detailed description, which is to be read in conjunction with the appended drawings.

SUMMARY OF THE INVENTION

The present invention is directed to a constellation of non-geostationary satellites that may be deployed and utilized in a matter the substantially increases global communications capacity and does not interfere with satellites in the existing geostationary ring around the earth's equator. A system embodiment includes a ground station, including communications equipment and a steerable antenna, located at a point on the earth, a plurality of satellites in inclined elliptical orbits that forms at least two repeating ground tracks that are displaced from each other in longitude, but all have the same shape. The repeating ground tracks bring the satellites the over the same points on the earth everyday. In the preferred embodiment the satellites have a mean motion of 3, meaning they orbit the earth three times per day, but other integer values of mean motion, such as 2 and 4 have potential applicability.

Each orbiting satellite has communications equipment on board for communicating with ground stations. The communications equipment on each satellite in the constellation is enabled only during a portion of the orbit when the satellite is near apogee, the point in the orbit where the satellite altitude is greatest and the satellite is moving most slowly from the viewpoint of the earth station. In the preferred embodiment, with mean motion 3, each of the satellites is enabled near its apogee for duration of 4 hours, which is 50 percent of total orbit period.

Each of the satellite ground tracks has a number of active arcs corresponding to the portion of the satellite orbits during which the communications equipment on the satellites is enabled to communicate. The orbits of the plurality of satellites are configured such that there are at all times at least two satellites in each active arc enabled to communicate. At the same time, the orbits of the satellites forming each ground track are configured such that the separation between enabled satellites in the same ground track is not less than a predetermined amount considered necessary to prevent interference. Preferably, the satellites in each ground track are equally spaced in mean anomaly to achieve the greatest number of satellites enabled at the same time. In the preferred embodiment, continuous communication at a 50 percent duty cycle requires a minimum of six satellites spaced evenly in mean anomaly. As one satellite of the array leaves an active arc, another satellite enters the active arc to take its place. Adding more arrays of six equally spaced satellites to each ground track in the preferred embodiment creates additional orbital slots. Actually, each group of six satellites, in the preferred embodiment, also provides orbital slots to other positions in the ground track spaced at 120-degree intervals around earth. In the preferred embodiment, the orbital parameters allow up 20 satellites to be placed in each active arc of the ground track while maintaining a minimum angular spacing between satellites of at least 2 degrees.

To avoid potential interference between satellites in different ground tracks, the orbits of the satellites in the two or more ground tracks are also configured such that each satellite enabled to communicate in one of the active arcs is separated by at least a predetermined angle from each of the satellites enabled to communicate in the other ground tracks. In the preferred embodiment, the argument of perigee is adjusted to make the elliptical orbits lean over, allowing active portions of adjacent ground tracts to be brought close together without interference. The argument of perigee in the present invention preferably ranges from 195 degrees to 345 degrees for apogee is in the northern hemisphere and from 15 degrees to 165 degrees for apogee is in the southern hemisphere.

In another aspect of the invention, each of the satellites in the constellation has an orbital height lower than the height necessary for geostationary orbits. This aspect of the invention has the benefit of reducing satellite size and weight for a given communications capacity, reducing launch requirements, and reducing satellite transmission delay. Also launching into elliptical orbits requires less energy than circular orbits, further reducing launch vehicle costs.

In a further aspect of the present invention, the orbits of satellites are configured such that the portion of the orbits during which communications equipment is enabled, is separated from the earth's equatorial plane by at least a predetermined amount. This feature avoids potential interference with existing satellites in the geostationary ring and allows the communications frequencies allocated to geostationary satellites to be reused for the non-geostationary constellation of the present invention.

In yet a further aspect of the present invention, each satellite has a power system configured to generate an amount of power less than that required when the communications equipment on the satellite is enabled, and more than that required when the communications equipment is not enabled. The power system can store the excess power generated when the communications equipment is not enabled, and use the stored power to supplement the generated power to meet the requirements of the communications equipment when it is enabled. For the preferred embodiment with a duty cycle of 50 percent, satellite weight saving resulting from this power conservation scheme can be significant.

To minimize perturbation effects caused by the earth's shape and achieve a stable orbit, the present invention preferably also uses the critical orbital inclination of 63.4 degrees.

The preferred embodiment can accommodate 24 ground tracks having 72 non-interfering active arcs in each hemisphere, or a total of 144 active arcs worldwide. If each arc is filled with a maximum of 20 active satellites, the total number of equivalent non-geostationary satellites slots that the present invention can support is 2880, or 16 times as many as the existing Geo stationary ring, assuming minimum two-degree satellite spacing.

DETAILED DESCRIPTION OF THE INVENTION

Figure 1:
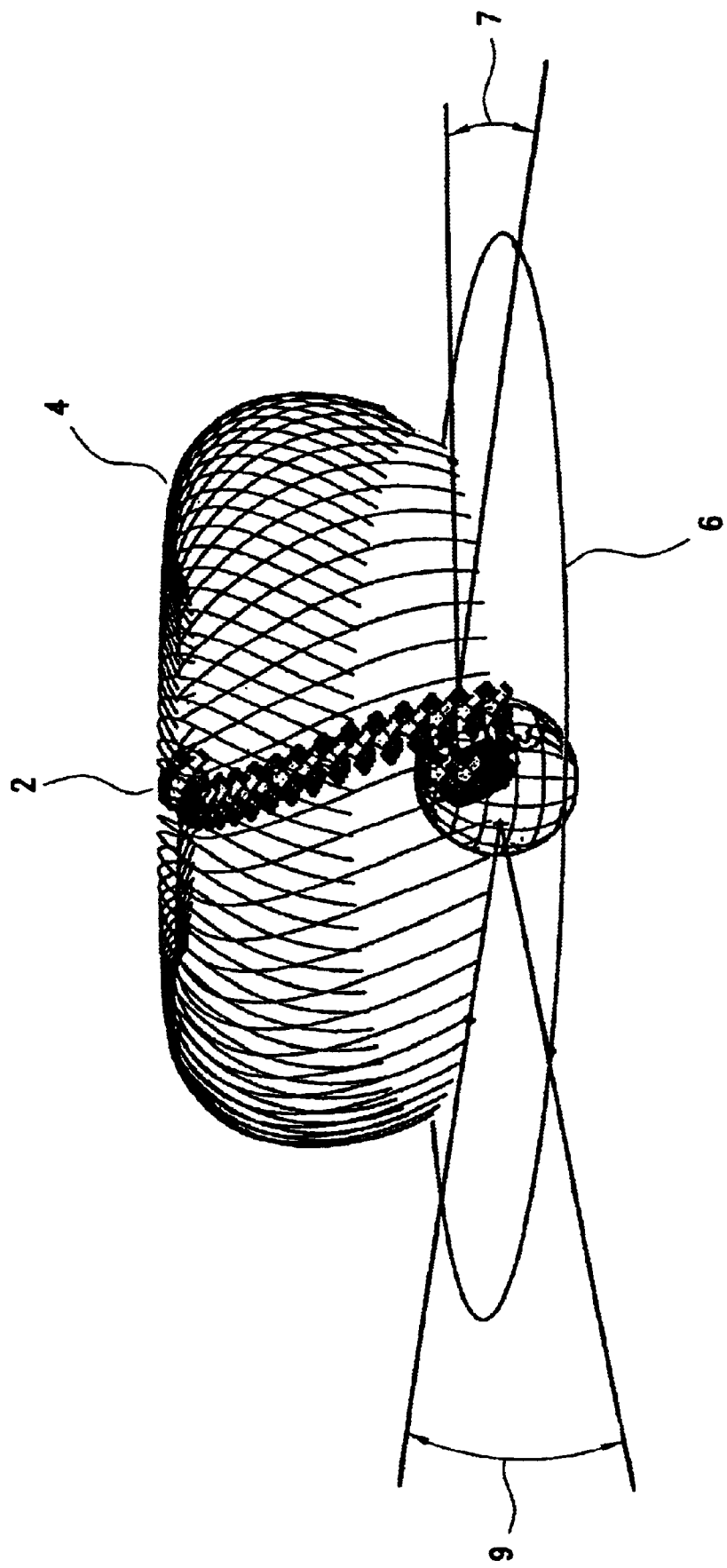
FIG. 1 illustrates the spatial relationship between the non-geostationary satellite arrays of the present invention and the geostationary ring.

The present invention is directed to a communications system including ground stations and a constellation of satellites in elliptical orbits that emulate many of the characteristics of geostationary satellites from the viewpoint of the ground stations on the earth. In the present invention, the parameters of the orbits in which the satellites travel, and their motive operation, allow a potentially large number of satellites to be available simultaneously to users without interfering with each other or with satellites in the equatorial geostationary ring. As illustrated in FIG. 1, and explained in greater detail below, the satellites of the present invention 2 operate in multiple arcs 4 well above the equator 6. These active arcs, and a complementary set below the equator (not shown), occupy a total of about 60 percent of the spherical space around the earth, as compared to only five percent for the geostationary ring. Within a region close to the equator, the satellites of the present invention are inactive, and hence do not interfere with geostationary satellites. FIG. 1 shows the angular separation 9 of the active arcs from the nearest geo satellite for a low latitude ground station, and the angular separation 7 for a high latitude ground station. The minimum separation (15 degrees) occurs for a high latitude ground site viewing a satellite that has just entered the southern end of an active arc.

Figure 2:
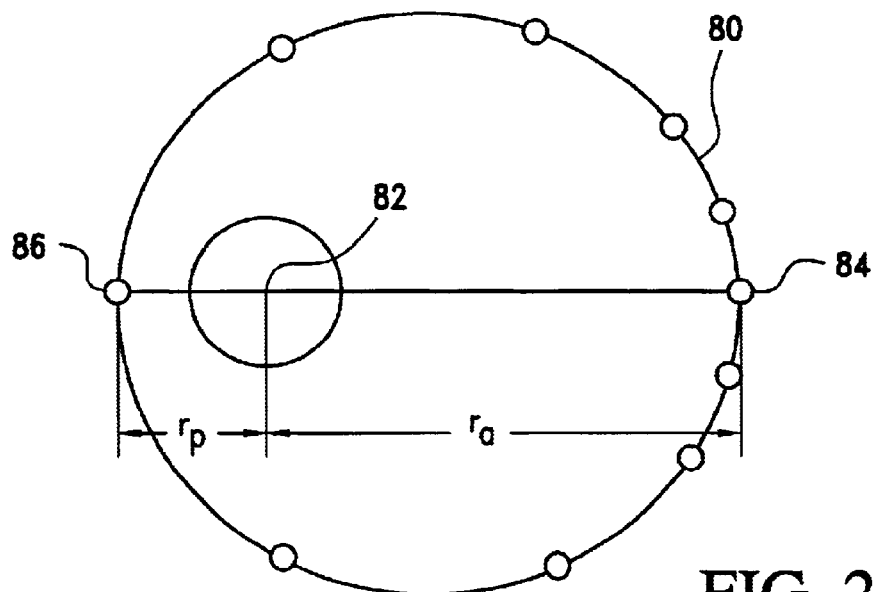
FIG. 2 shows the basic characteristics of an elliptical satellite orbit including the bunching together of satellites near apogee.

The present invention takes advantage of the fact that satellites in elliptical orbits spend more time near the apogees of their orbits, when they are farther from the earth, than near their perigees. FIG. 2 shows a typical elliptical orbit 80 having a focus 82. The satellite orbits along the path of the ellipse 80, with the center of the earth be at the focus position 82 (the "occupied focus").

The apogee 84 and perigee 86 of the orbit are defined by the points on the ellipse farthest from and closest to the focus, respectively. The major axis of the ellipse 88 runs through the two foci of the ellipse, from apogee 84 to perigee 86. The two lengths along the semi-major axis, from the apogee 84 and perigee 86 to the occupied focus 82 are called the "radius of apogee" and the "radius of perigee", respectively. The amount of difference between these distances defines the eccentricity of the ellipse. The semi-major axis is defined as half of the major axis of the ellipse. In terms of the semi-major axis, a, and eccentricity, e, the radius of apogee and the radius of perigee are:

$$r_e = a \cdot (1+e);$$

and $$r_p = a \cdot (1-e)$$

The greater the eccentricity, the less the ellipse resembles a circle.

The position of a satellite in an elliptical orbit follows Kepler's second law of motion, which states that the orbiting satellite will sweep out equal areas of the orbit in equal times. This results in the satellite moving rapidly when it is at or near perigee and moving slowly when it is near or near apogee. For a 12-hour orbit, for example, a satellite will spend eight hours near apogee. The circles on the ellipse of FIG. 2 represent even time intervals in the motion of a satellite about the orbit, and show clearly how the satellite slows down and dwells for an extended period of time near apogee.

The present invention defines a system using a constellation of satellites chosen to operate such that the desired point on the earth always tracks and communicates with a satellite at or near apogee. By using prograde orbits, those in which the satellite is rotating in the same directional sense as the earth, the satellites at apogee can be made to appear to move very slowly in the sky.

Although the satellites in the present invention resemble geostationary satellites in that they appear virtually stationary when at or near apogee, typically moving at a rate of less than eight degrees per hour, each does eventually leave its active arc, and, as explained in further detail below, is replaced by another satellite that enters its active arc at the same time, within view of the same ground stations. This characteristic means that unlike geo satellites, each satellite of the present invention does not operate 100 percent of the time. Outside of their active arcs, the satellites are typically not using their transmit and receive capability, and hence do not use a large portion of their power capacity.

Since each satellite is fully powered only part of the time, the satellite can be generating and storing power during the period when it is not active and use it while in its active arc. Hence the satellite power source, typically an array of solar cells, can be sized to provide only a fraction of the power needed during operation with the balance coming from the energy stored, typically in rechargeable batteries, during the inactive parts of its orbit. For example, if a satellite in the present invention is operating only 50 percent of the time, its power system can, in principle, be designed to generate 50 percent of the full load power (plus whatever power is required to maintain housekeeping functions). This mode of operation can result in a significant saving in the weight and size of the satellites.

Figure 3:
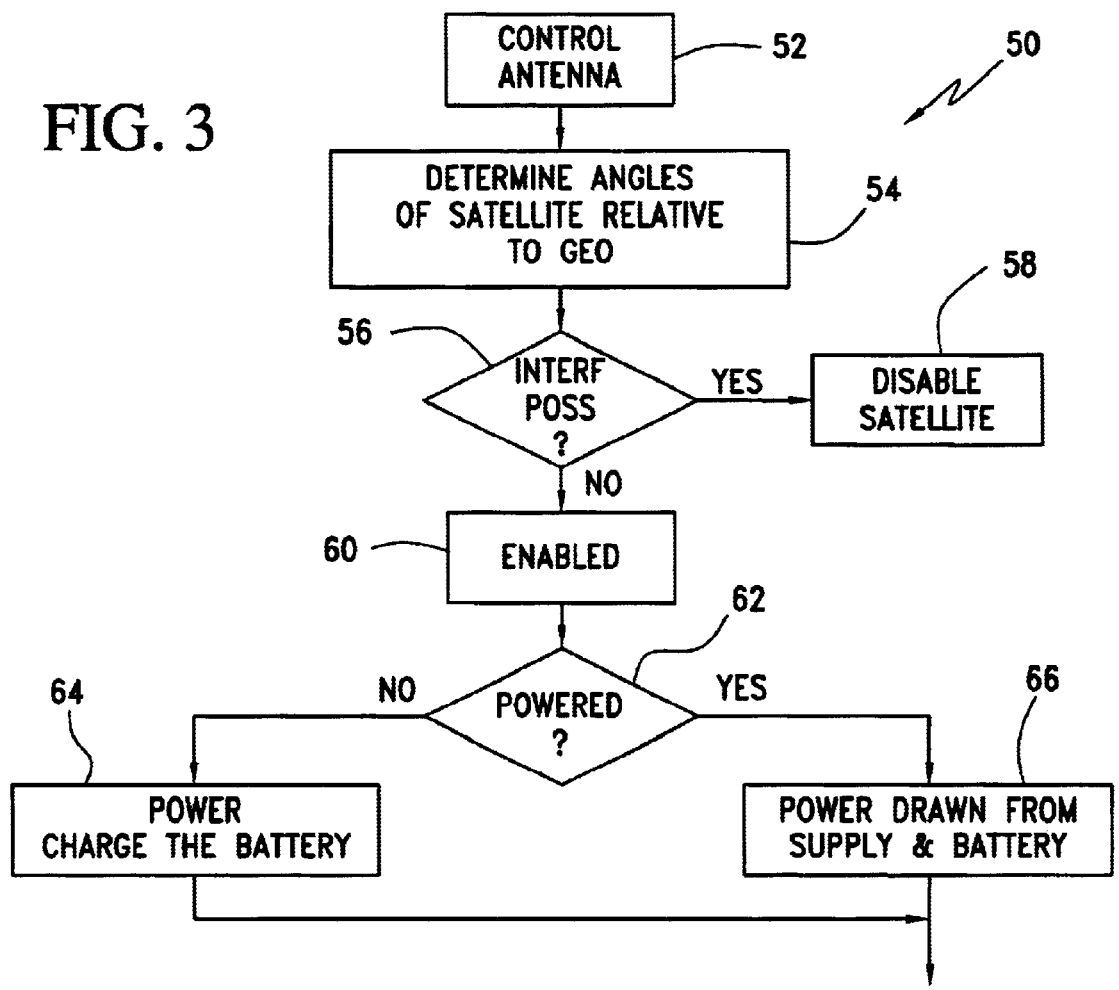
FIG. 3 is a flowchart showing a power consumption methodology of a satellite according to the present invention.

FIG. 3 depicts this power consumption methodology of a satellite of the present invention in a flowchart format that is generally designated 50. Step 52 represents controlling a ground station antenna tracking the satellites. This requires that a processor keep track of the positions of the satellites in orbit. The pointing angle between the non-geo satellite and position of the geo ring is determined in step 54. Step 56 determines if there is a possibility of interference. If there is any possibility of interference, satellite communications is disabled in step 58. If interference is not possible at step 56, then the satellite is enabled at step 60. An enabled satellite can be, but is not necessarily, turned on. Therefore, step 62 determines if the satellite is powered. This may be determined from the satellite's position in the repeating ground track, or other information. If the satellite is not powered at step 62, the battery is charged at step 64. If the satellite is powered, then power is drawn from both the supply and the battery at step 66.

Operating the satellites only in the region of apogee also prevents interference with satellites in the geostationary ring. In the present invention, the active orbital arcs are well away from the equator because coverage has been optimized to place satellite apogee, where the satellites spend most of their time, over high traffic density areas in the northern and southern hemispheres. The present invention will allow the existing satellite frequency allocations to be reused many more times and help to reduce the intense worldwide pressure on scarce spectrum resources.

In addition to avoiding possible interference with the geostationary ring, the present invention provides high elevation angles to the satellites while in their active arcs. As noted earlier, maximizing elevation angle materially reduces the atmospheric effects, blockage and multi-path that often adversely affect communication with geo satellites.

The system of the present invention has a number of other distinct advantages. Importantly, integral values of mean motion are preferably employed for the satellites in the constellation to ensure, as explained in detail below, that the ground tracks of the satellites repeat on a daily basis. The ground track of a satellite is the path traced out on the surface of the earth by a line extending from the center of the earth to the satellite. If the ground tracks are made to repeat each day, the orbit apogee passes repeatedly over the same location relative to a desired geographic area. The ground stations in the target area will always have one active satellite at or near apogee to communicate with, although as noted above, not the same satellite throughout the day.

Although the satellite system according to the present invention performs in many of its aspects like a geostationary satellite system, the satellites in the system orbit at a significantly lower altitude. A geostationary satellite orbits at 36,000-kilometer altitude, while the 8-hour satellites of the present invention, for example operate at an altitude between approximately 21,000 and 26,000 kilometers in their active arcs. The size of a satellite tends to be directly proportional to the square of the distance between the satellite and the earth. Because the path loss of the communications link to satellites in these elliptical orbits is significantly less than the path loss to geostationary orbit, both the power and antenna size of the communications package on the satellites can be reduced accordingly.

Lower orbital altitude also yields benefits in terms of the cost of launching the satellites. Unlike Geo satellites, satellites elliptical orbits do not require apogee motors to boost them into final orbit. This factor alone reduces by approximately half the launch vehicle lift requirement per satellite. In addition, the reductions in size and weight of the satellite power and communications systems, mentioned above, all add to the benefits of present invention from viewpoint of launch costs.

Before describing in detail the preferred satellite arrangement according to the present invention, the nomenclature utilized herein to describe the characteristics of satellite orbits will be first defined. The term "mean motion" is a value indicating the number of complete revolutions per day a satellite makes. As earlier noted, if this number is an integer, the ground tracks of the satellites repeat each day and each ground track for that day overrides the tracks of the preceding day.

Mean motion (n) is conventionally defined as the hours in a day (24) divided by the number of hours that it takes a satellite to complete a single orbit. For example, a satellite that completes an orbit every eight hours (an "8hour satellite") has a mean motion of three. Integral mean motions of two, three and four are of particular applicability, but the present invention does not exclude higher values. The "elevation angles", $\delta$, is the angle from the observers horizon up to the satellite. As satellite on the horizon would have zero degrees elevation while satellites directly overhead would have 90 degrees elevation. Geo satellites orbit near the equator, and usually have a 20–30 degree elevation from points in the United States.

The "inclination", I, is the angle between the orbital plane of the satellite and equatorial plane. Prograde orbit satellites orbit in the same orbital sense (clockwise or counter clockwise) as the earth. For prograde orbits, inclination lies between zero degrees and 90 degrees. Satellite retrograde orbits rotate in the opposite orbital sense relative to the earth, so for retrograde orbits the inclination lies between 90 degrees and 180 degrees.

The "critical inclination" for an elliptical orbit is the planar inclination that results in zero apsidal rotation rate. This results in a stable elliptical orbit whose apogee always stays at the same latitude in the same hemisphere. Two inclination values satisfy this condition: 63.435 degrees for prograde orbits or its supplement 116.565 degrees for retrograde orbits.

The "ascending node" is the point on the equator where the satellite passes from the southern hemisphere to the northern hemisphere. The right ascension of the ascending node ("RAAN") is the angle measured eastward in the plane of the equator from a fixed inertial axis in space (the vernal equinox) to the ascending node.

For the present invention, the longitudinal spacing between the ascending nodes of different satellites in the constellation is called "S", and is uniform in the preferred embodiment.

The "argument of perigee" is a value that indicates the angular position in the plane of the orbit where perigee occurs. Arguments of perigee between zero degrees and 180 degrees locate the position of perigee in the northern hemisphere, and hence concentrate satellite coverage in the southern hemisphere. Conversely arguments of perigee between 180 degrees and 360 degrees locate the perigee in the southern hemisphere and hence concentrate coverage on the northern hemisphere.

"Mean anomaly", M, represents the fraction of an orbit period that has elapsed since the satellite passed through perigee, as expressed in degrees. For example, the mean anomaly of a satellite two hours into an 8-hour orbit is 90 degrees (one quarter of a period). The total mean anomaly over the period of a day for a satellite with mean motion n is simply n times 360 degrees.

In January 1999, an application was filed before the Federal Communications Commission (FCC) by Virtual Geosatellite LLC for the construction of a global broadband satellite communications system based on the teachings of U.S. Pat. No. 5,845,206, issued Dec. 21, 1998, and U.S. Pat. No. 5,957,409, issued Sep. 28, 1999. The system proposed in the application employs three arrays of satellites in elliptical orbits, two arrays covering the northern hemisphere and one covering the southern hemisphere, each array having five 8-hour satellites emulating many of the characteristics of geo satellites.

Figure 4:
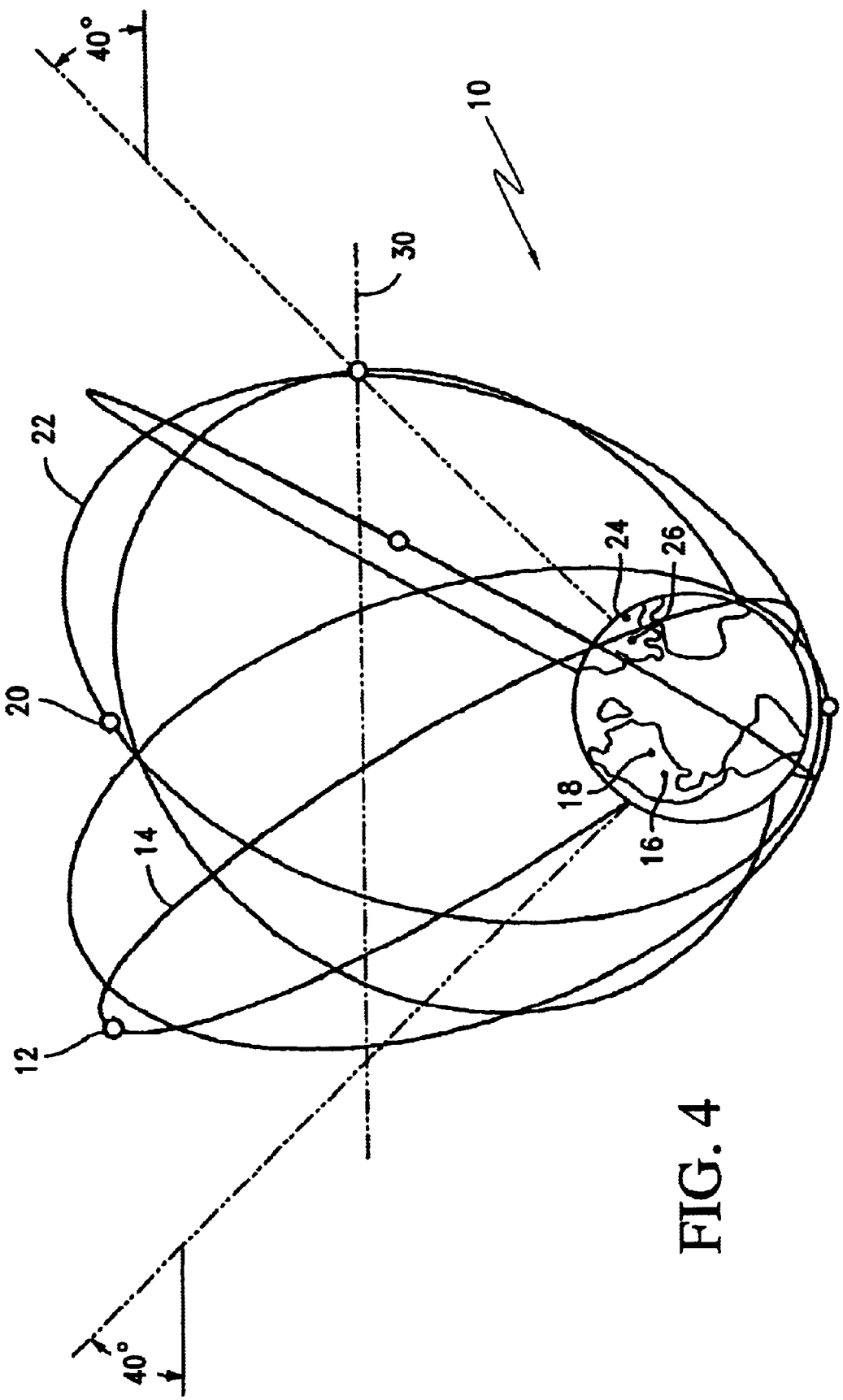
FIG. 4 shows a perspective view of five elliptical orbits having on satellite in each orbit according to the prior art.

FIG. 4 depicts one of the five-satellite arrays, generally designated 10, of the prior art system. Virtual geo satellite 12 is shown in elliptical orbit 14 around the earth. The communications equipment on satellite 12 communicates with earth ground stations 16 and 18. Virtual geo satellite 20, shown in a separate elliptical orbit 22, is also is in communication with ground stations 16 and 18.

Like geo-based systems, the virtual geo satellites implemented in accordance with the prior art system are virtually continuously in the same general location or region in the sky. Unlike geo-based systems, however, the ground communications equipment of the prior does not always communicate with the same satellite. For example in the illustrated embodiment, ground stations 16 is initially in communication with satellite 12, but is later in communication with satellite 20 that is in elliptical orbit 22. The virtual geo satellites move slightly relative to the earth when they are at or near apogee. However, the one virtual geo satellite at apogee later moves to perigee, and still later to other locations over other areas of the earth including, for example, ground stations 24 and 26. The prior art system allows for operation over specific geographic locations that are preferentially covered. For example, continental landmasses can be covered by the constellation to the exclusion of other areas, such as the oceans between the continents. In the illustrated prior art embodiment, for example, the United States, Europe and portions of Asia and Russia are preferentially covered.

Figure 5:
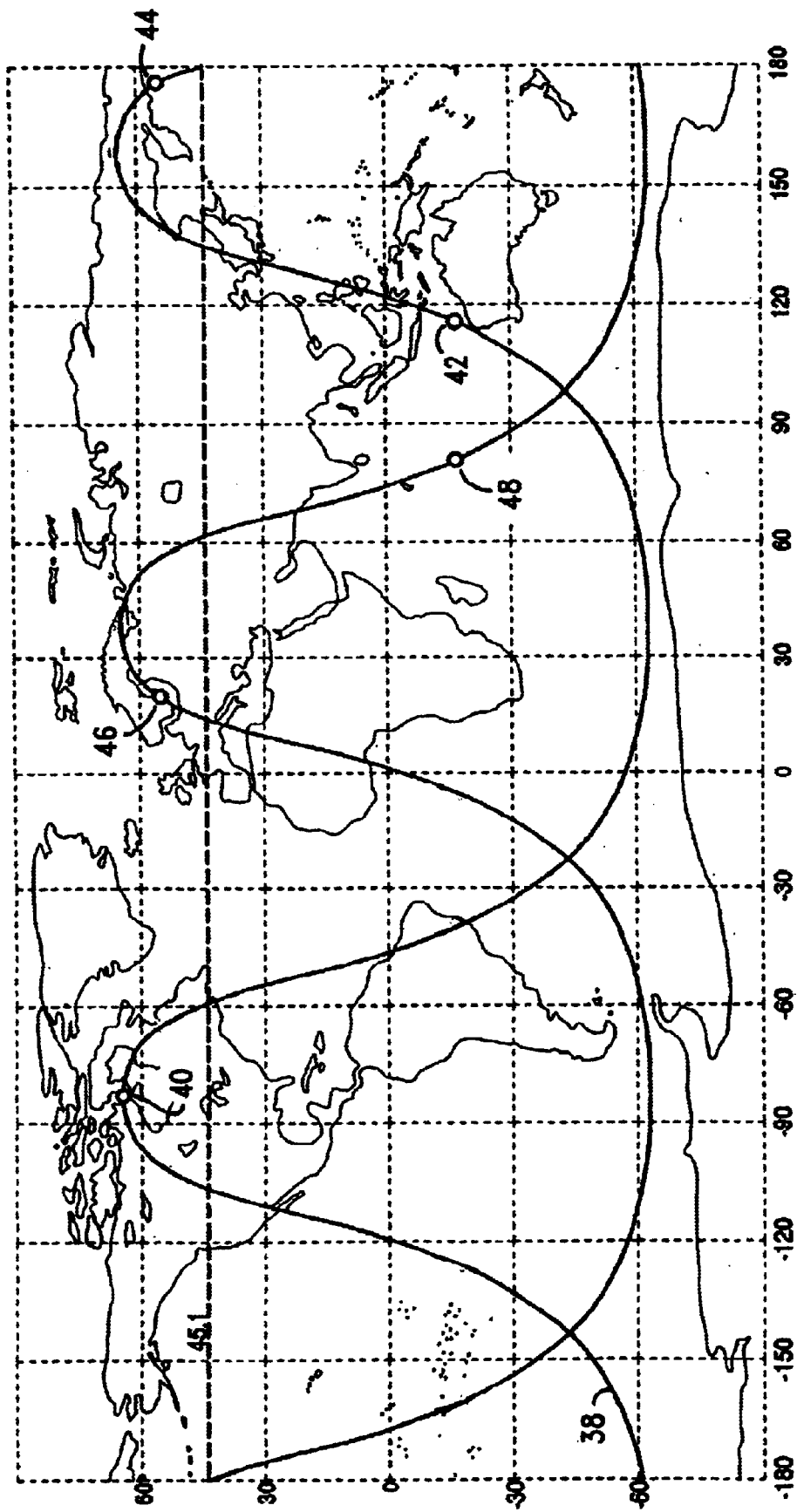
FIG. 5 is a Cartesian plot showing a ground track for the elliptical orbits of FIG. 1 according to the prior art.

The five satellites depicted in FIG. 4 are in orbits that have the same values for radius of apogee, radius of perigee, inclination and mean motion, but are spaced in RAAN and in mean anomaly such that they all follow a common ground track. FIG. 5 shows a plot of the ground track 38 in Cartesian coordinates, superimposed on a Mercator projection of the earth, for the prior art five-satellite array of FIG. 4. Note that the plot of the single ground track 38 actually "folds over" from the left edge of the world map to the right edge, giving it the appearance of multiple traces. In the prior art system, the satellites have a mean emotion of three, thus making three orbits of the earth each day. The orbits are equally spaced around the axis of the earth, and are equally spaced in mean anomaly. For the five satellites the orbital spacing in longitude, S, is set equal to 72 degrees. In order to have the five satellites in the five different orbits all follow the same ground track, their spacing in mean anomaly must be n times S, or 216 degrees. As can be seen from FIG. 5, the satellites, having mean motion three, make three loops around the world. In general, the number of loops in the ground track will be the same as the mean motion. The positions of the loops can be shifted east or west in longitude to target different coverage areas by adjusting the RAANs of all of the orbits of the array while maintaining their relative spacing. In the prior art system depicted, the argument of perigee is 270 degrees, which makes the loops symmetrical about the apogee of the orbits. As the apogee is in the northern hemisphere, the prior art system shown favors coverage of the northern hemisphere. As can be seen, there is one satellite 40, 44, 46 in each of the active arcs at the top of the loops near apogee, and two inactive satellites 42, 48 in positions between the active arcs. In this particular case the ends of the active arcs are each at 45.1 degrees north latitude and the middle at 63.4 degrees north latitude, which is the same as the angle of inclination. This provides a very large separation (approximately 40 degrees) between the active arcs and the geostationary ring. The duty cycle of each satellite shown in FIG. 4 is 60 percent, meaning that each satellite is active for 60 percent of time, centered around its apogee. When an active satellite is about to leave one end point of an active arc, one of the inactive satellites appears at the other end point to take its place and is switched from an inactive state to an active state. The prior art system offers the opportunity to add more satellites to each active arc and to insert a second ground track with an equal number of satellites, between the loops of the original ground track in each hemisphere. Each orbital position in each of the active arcs constitutes, in effect, an orbital slot, which in the prior art system has been dubbed a "V-slot". However, the possible number of such virtual slots for any orbital configuration is ultimately limited by the spacing between satellites at apogee within each active arc, and the spacing between satellites in the vicinity of the points where the active arcs of adjacent ground tracks intersect. It has been determined that the prior art virtual geo system can accommodate a maximum of 14 satellites in each active arc while still maintaining minimal 2 degree satellite spacing. If in addition, a second ground track is added to the southern as well as the northern hemisphere, raising the total number of active arcs to 12, then the maximum potential number of virtual sots is 14×12 or 168 virtual slots.

The present invention takes advantage of a selected set of orbital parameters to allow the number of virtual orbital slots per active arc and the total number of active arcs disposed around the earth, to be increased dramatically over the prior art system.

Figure 6A:
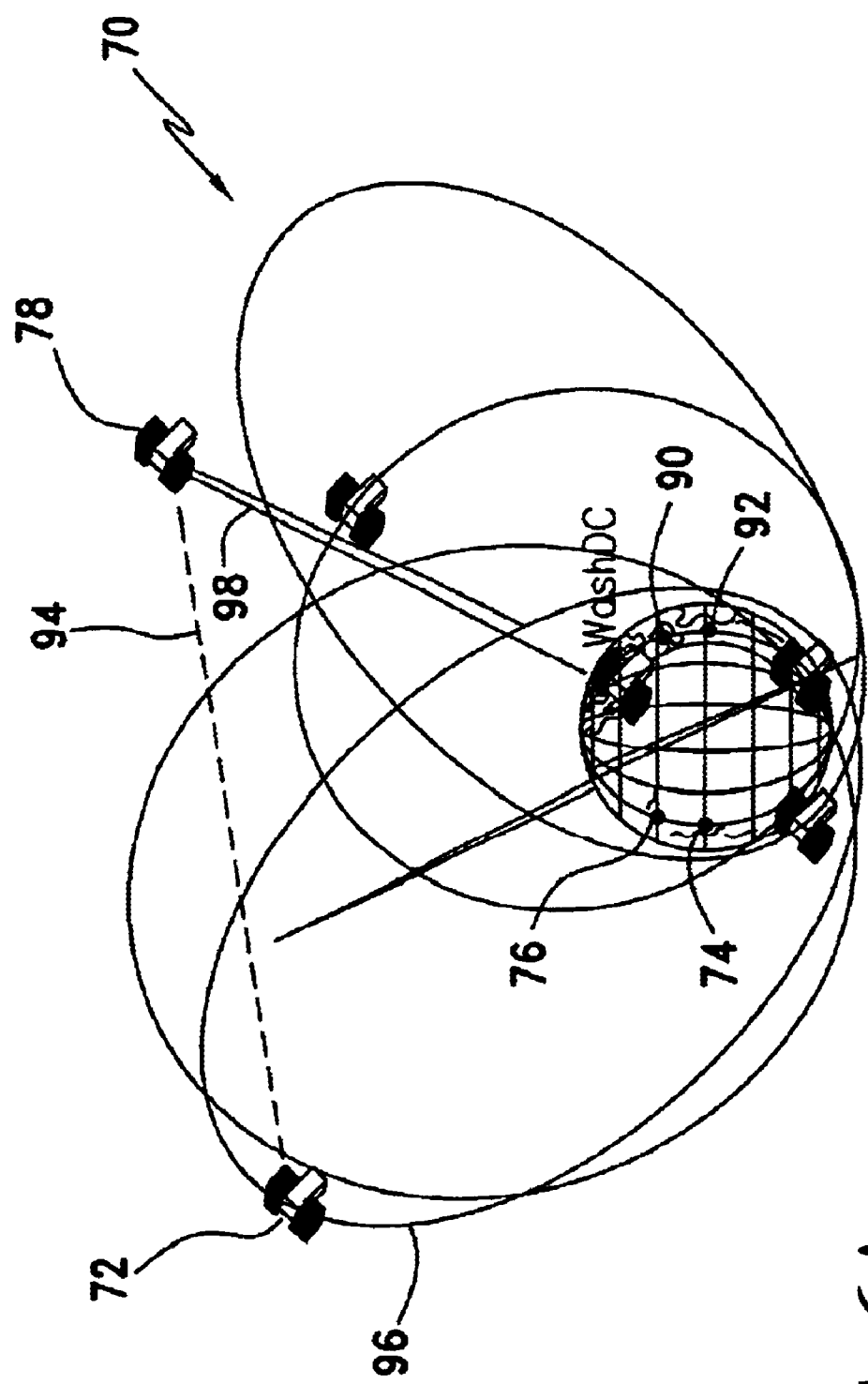
FIGS. 6A–6B show equatorial and polar perspective views of six elliptical orbits having on satellite in each orbit according to the present invention.

FIG. 6A depicts the basic six-satellite array, generally designated 70 of the present invention. The six satellites are in elliptical orbits around the earth all have the same radius of apogee, radius of perigee, inclination and mean emotion, and are spaced in RAAN and in mean anomaly such that they all follow a common ground track. The communications system on satellite 72, which is in orbit 96, communicates with earth ground stations 74 and 76. Satellite 78 shown in separate elliptical orbit 98, is also in communication with ground stations 74 and 76, but at later time will be in communication with ground stations 90 and 92. Satellites 72 and 78 may also be connected with an inter-satellite link 94.

Figure 6B:
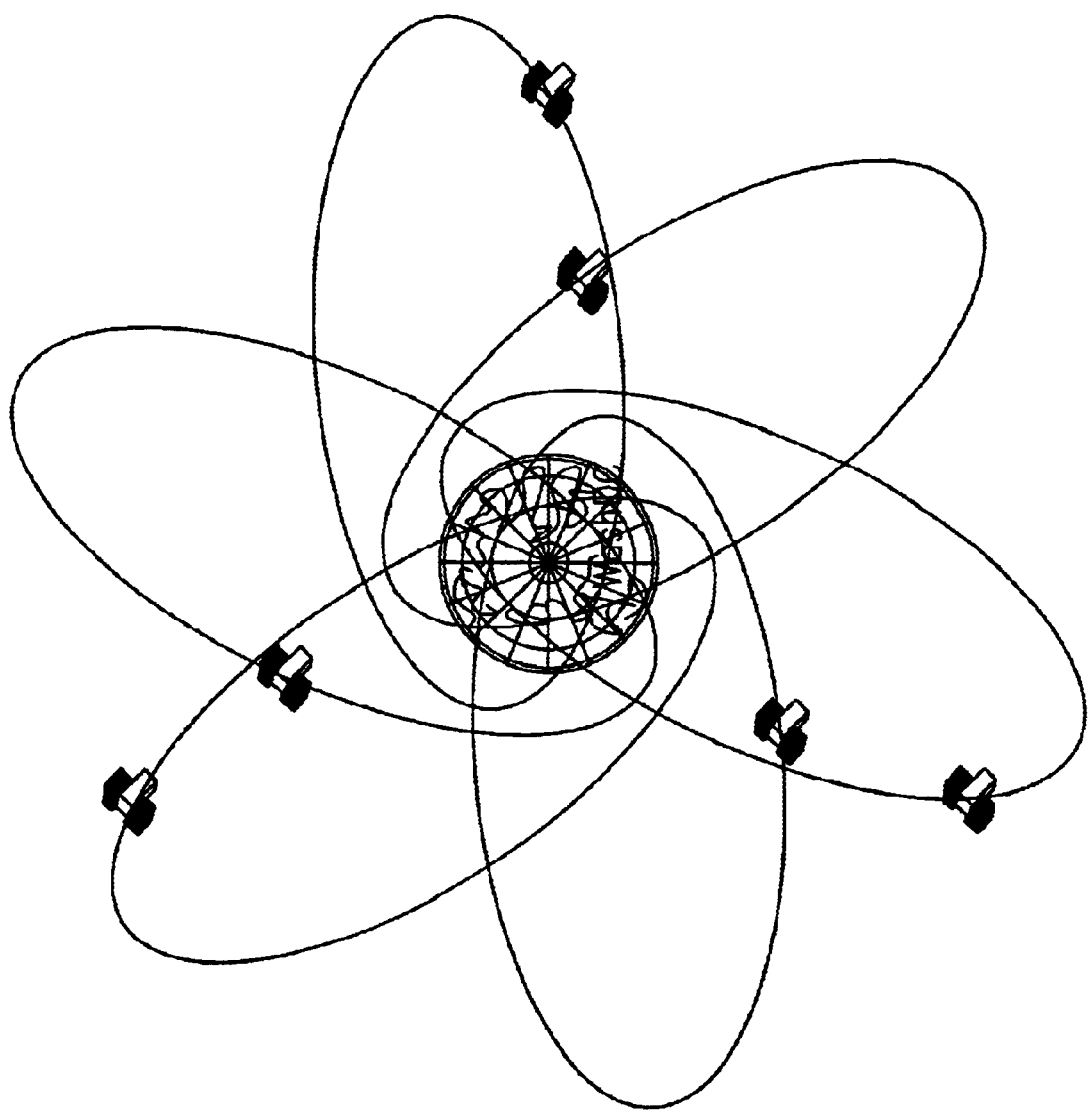

FIG. 6B shows the same basic six-satellite array of the present invention looking down from the North Pole. This perspective shows very clearly that the all of the elliptical orbits have the same shape and are spaced evenly around the earth.

Figure 7:
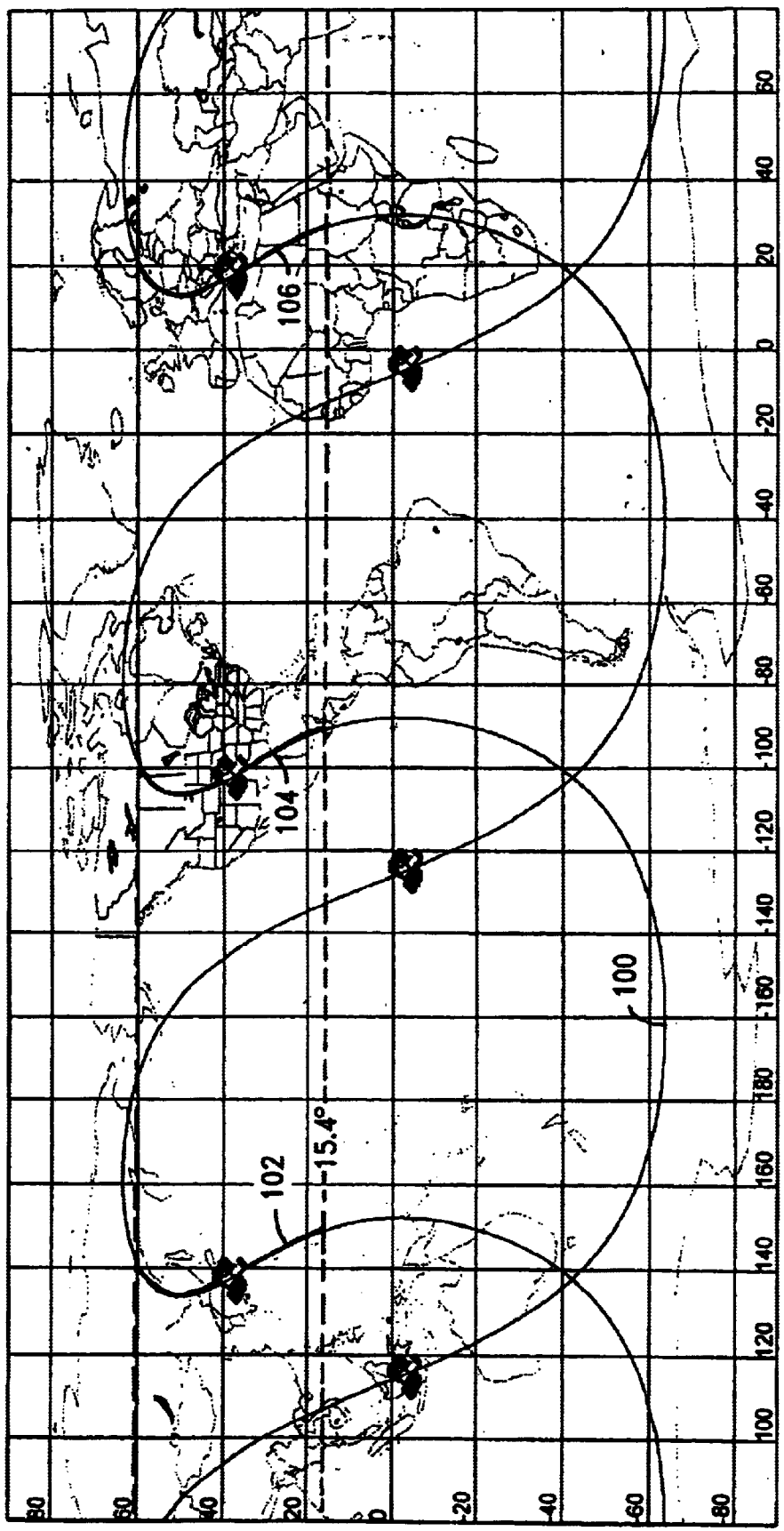
FIG. 7 is a Cartesian plot showing a ground track for the elliptical orbits of FIG. 6 according to the present invention.

Unlike the prior art system, the elliptical orbits of the present invention have arguments of perigee that are not the usual 90 or 270 degrees, but a value in between 180 degrees and 270 degrees, such that the orbital ellipse is in effect "leaning over" towards the equator. The apogee occurs in the vicinity of 40 degrees latitude, which has the benefit of being closer to populations at the middle latitudes that such a system might be likely to serve. Another difference from the prior art system is that the basic array of present invention contains six satellites operating with a duty factor of 50 percent, that is, the satellites are in their active arcs and operating only 50 percent of the time. The essential parameters of the elliptical orbits for the preferred embodiment are:

Mean Motion: 3
Semi-major axis: 20,261 km
Eccentricity: 0.6458
Inclination: 63.41 degs.
Argument of perigee: 226.445 degs.
Latitude of apogee: 39.5 degs.
Altitude at Apogee: 26,975 km
Latitudes at ends of active arc: 15.4 degs., 60 degs .
Altitude at ends of active arc: 20,735 kilometers FIG. 7 shows a Mercator projection of the ground track for the basic array depicted in the FIGS. 6A–6B. As in the prior art system, there are three loops in the ground track, each over a population center in the United States Europe and Asia. However, because the argument of perigee now makes the orbits lean, the loops of the ground track are no longer symmetrical about a meridian of longitude. The active arcs 102, 104, 106 of the ground track are on one side of each loop and are oriented in a predominantly north-south direction. On the Mercator projection the active arcs are said to resemble a coiled cobra, with its head lying at the higher latitudes and the body portion lying at the lower latitudes. Although the active arcs begin at lower latitudes than in the prior art system, there is sufficient angular separation to avoid interference with any of the geo satellites. With even spacing in mean anomaly between satellites, half the six satellites are, at any time, in the active arcs of the ground track, while the other half are traveling between the active arcs.

Figure 8:
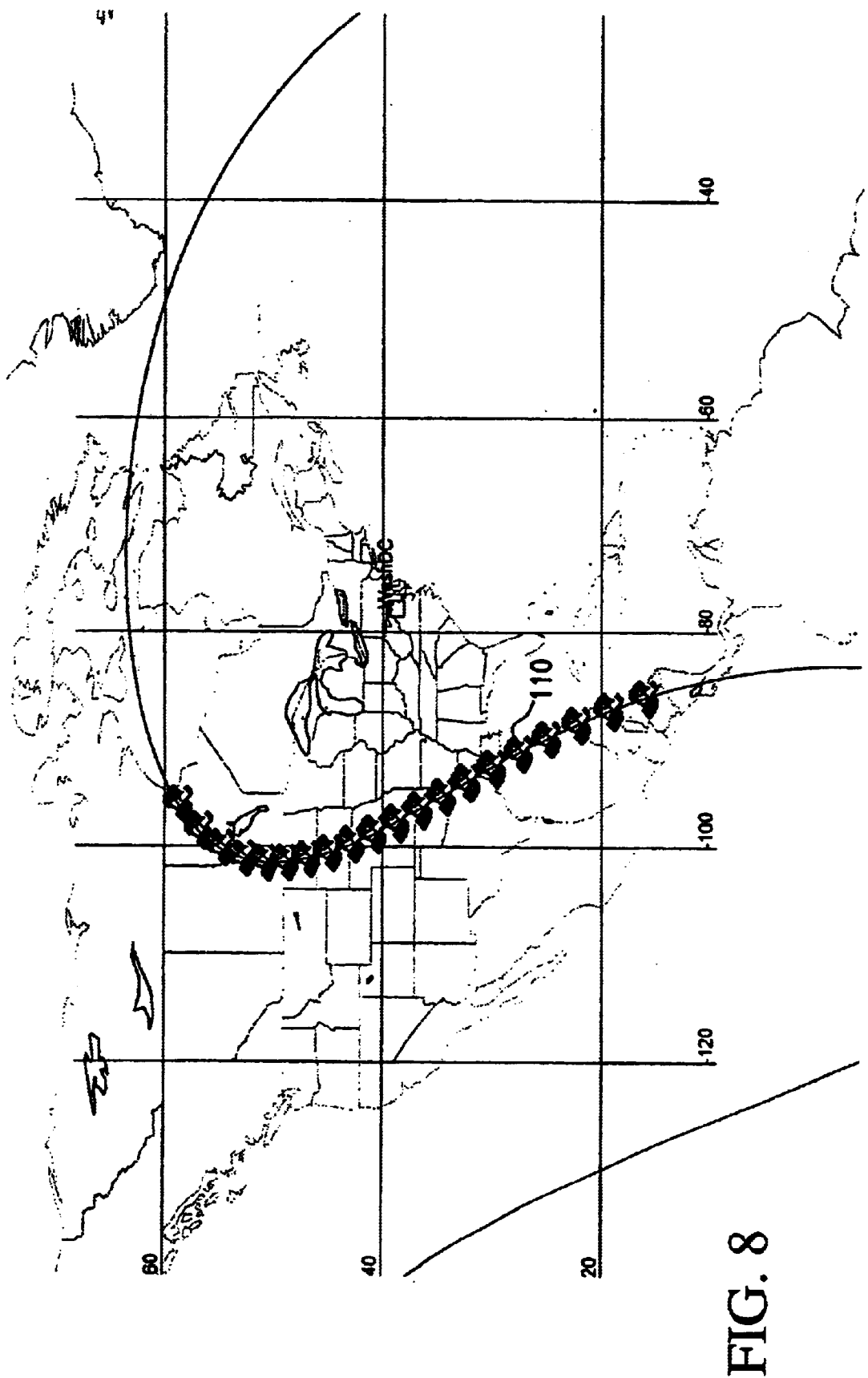
FIG. 8 is a Cartesian plot showing in detail 20 satellites in an active arc according to the present invention.

FIG. 8 illustrates the method in accordance with the present invention, for increasing the number of available satellite slots in each ground track by adding additional satellites to fill each of the active arcs. It has been determined that up to 20 satellites 110 may be fit into each active arc while still maintaining a minimum separation between satellites at perigee apogee of at least two degrees, which is the spacing criterion for satellites in geostationary slots. Each satellite has the parameters specified above, with a difference between each satellite in RAAN of three degrees and a difference in mean anomaly of nine degrees to ensure that each satellite follows the same ground track, and that there is a minimum of two degrees spacing between satellites along the ground track at apogee. Since there are three loops for each ground track, a completely filled ground track, in accordance with the present invention, provides a total of 60 nongeostationary slots around the world. Because half of the satellites in each ground track are inactive at any point in time, the total number of satellites required to completely fill out each ground track is 120.

Figure 9:
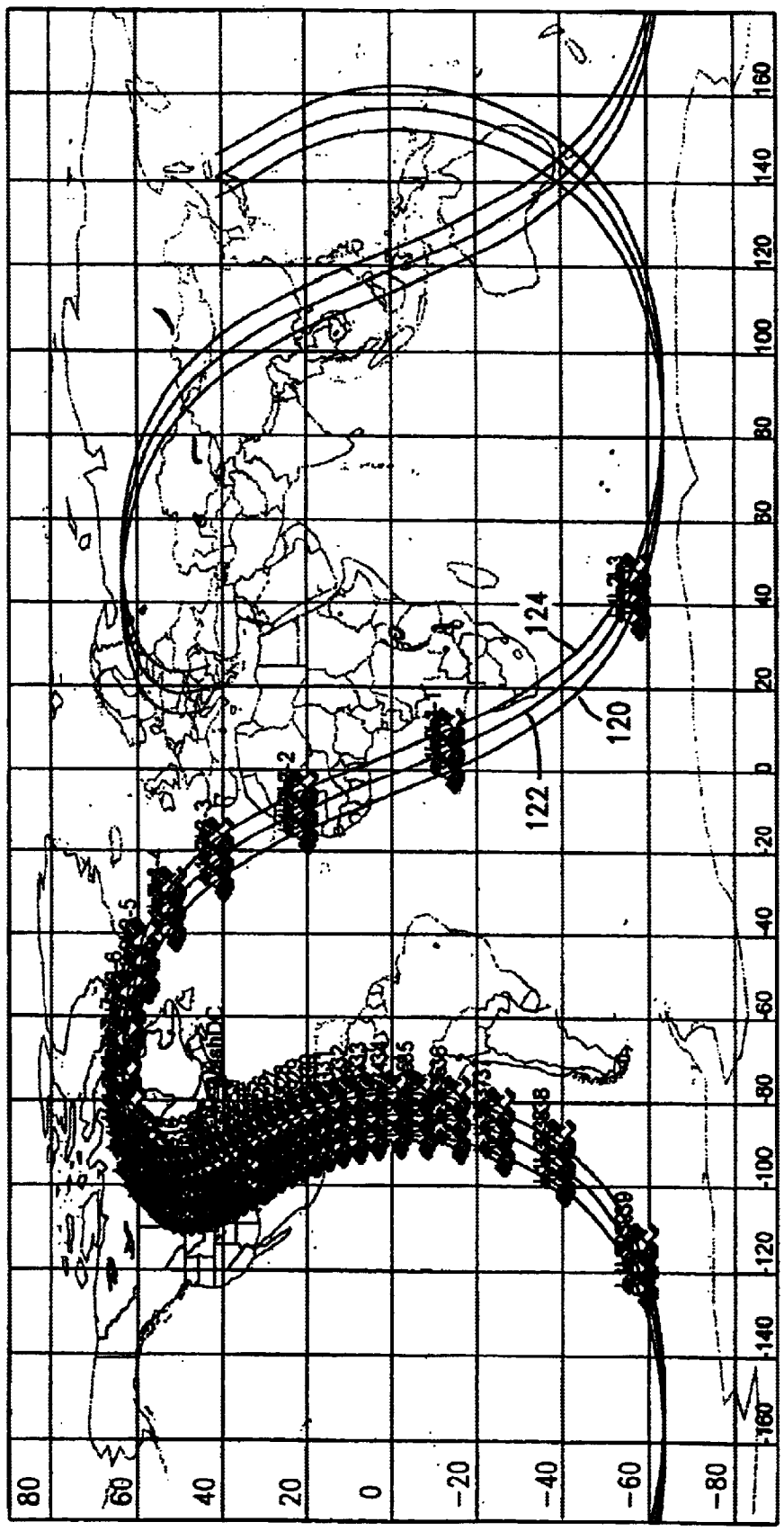
FIG. 9 is a Cartesian plot showing 40 active and inactive satellites in each of three adjacent ground tracks according to the present invention.

FIG. 9 illustrates the method, according to the present invention, for increasing the number of available satellite slots by adding additional ground tracks displaced from each other by a small longitudinal increment, which in the preferred embodiment shown is five degrees. The nearly north-south orientation of the active arcs in the present invention makes it possible to pack ground tracks closer together without having the active arcs overlap, and, therefore, without incurring potential interference between satellites in the adjacent ground tracks. For the sake of clarity, FIG. 9 shows only one of the loops of three adjacent ground tracks 120, 122, 124 in detail with the 40 satellites, both active and inactive, in the loop. In the active arc between 15.4 and 60 degrees north latitude the satellites are bunched together and moving in formation along the tracks.

Figure 10:
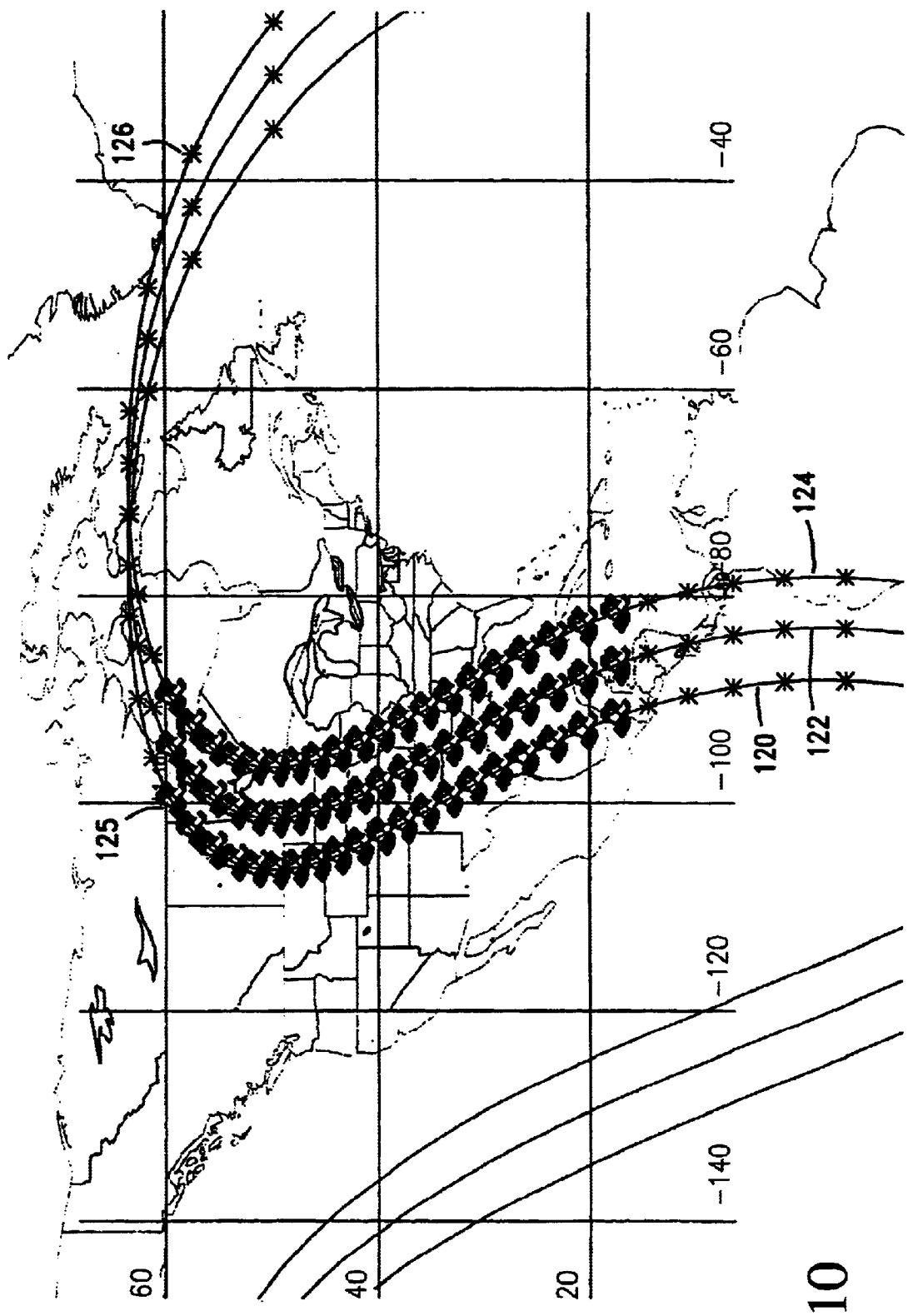
FIG. 10 is a Cartesian plot showing in detail the active arcs of three adjacent ground tracks according to the present invention.

FIG. 10 provides a more detailed view of the same three adjacent ground tracks 120, 122, 124, each with 20 active satellites 125, traversing North America. The positions of the inactive satellites 126 are shown as well, by a different symbol. In this case, the spacing between tracks is minimum at the northern end of the active arc. By deactivating the satellites at 60 degrees north latitude, the possibility of interference at the point where the ground tracks cross, at 63.4 degrees north latitude, is avoided.

Figure 11:
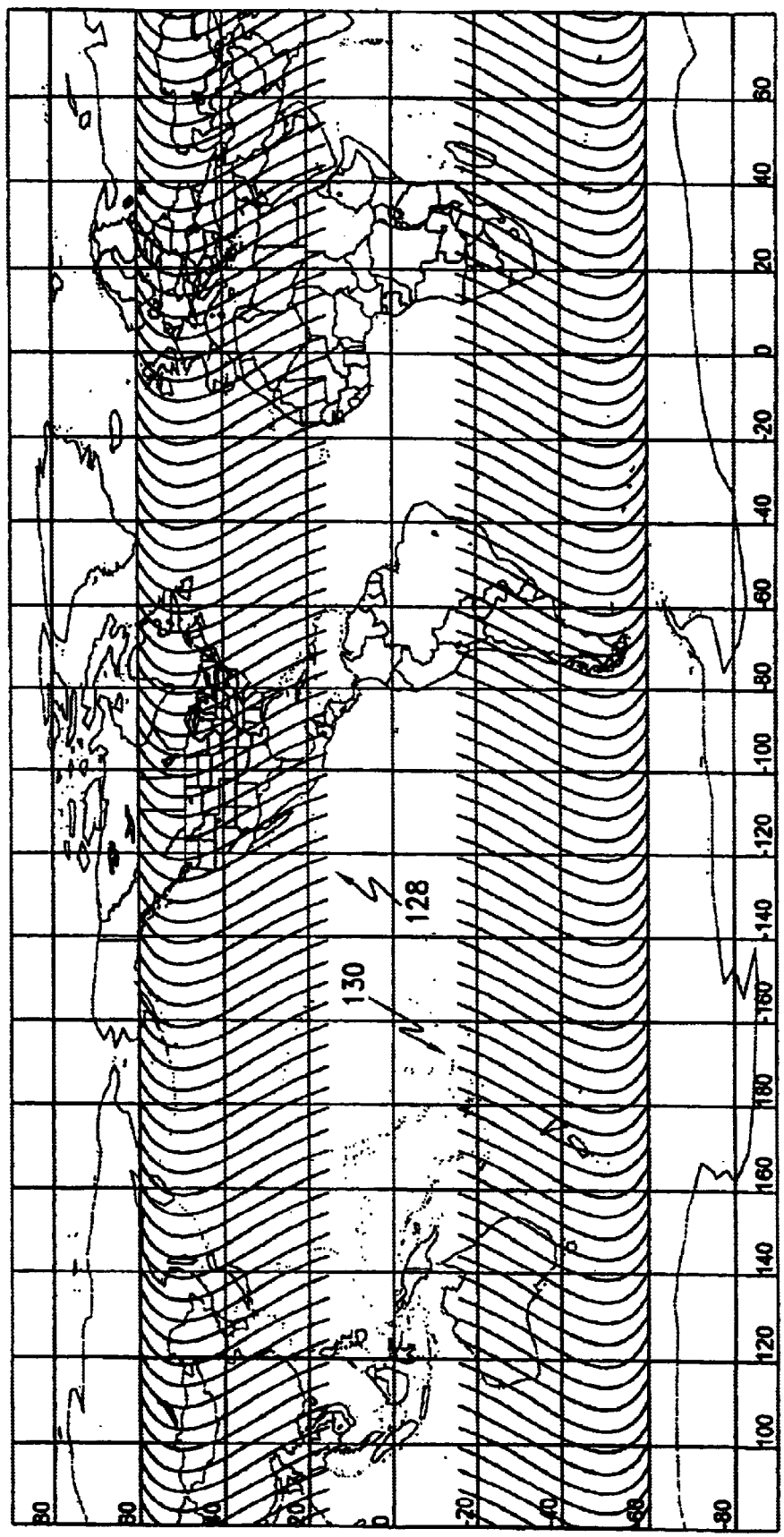
FIG. 11 is a Cartesian plot showing 144 in the northern and southern hemispheres according to the present invention.
Figure 12:
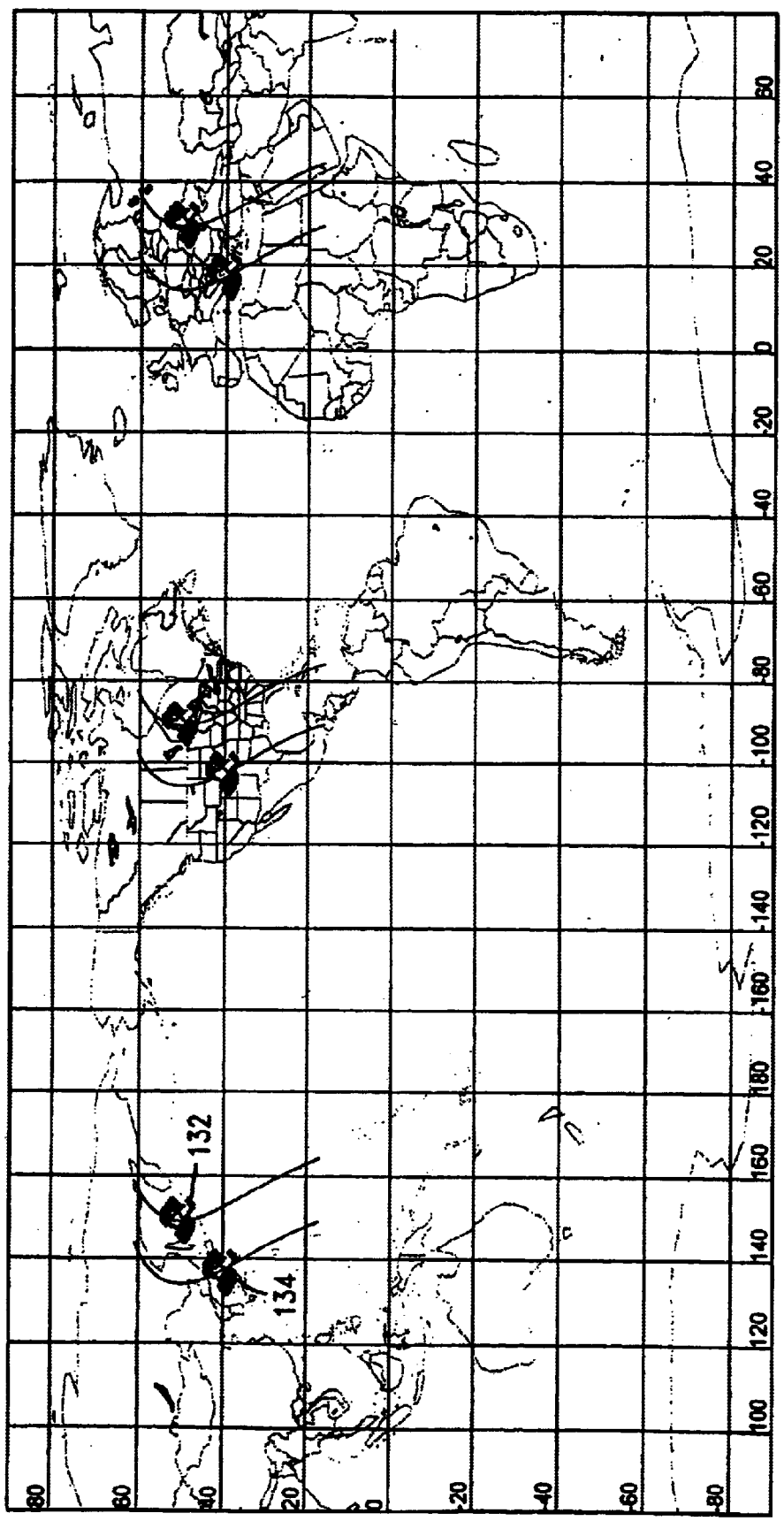
FIG. 12 is a Cartesian plot showing the active arcs of two adjacent ground tracks with staggered satellites according to the present invention.

FIG. 11 shows all of the active arcs 128, 130 possible with the preferred embodiment by the stacking the ground tracks five degrees apart in longitude in both the northern and southern hemispheres. By spacing of the active loops in each hemisphere five degrees apart the total number of active loops per hemisphere is 360 degrees/5 degrees (72), or a total of 144 active arcs in both hemispheres. If each active loop is filled with the maximum of 20 satellites discussed above, then the total effective number of orbital slots that can be achieved with in the preferred embodiment is 2,880. With a duty cycle of 50 percent, the 2,880 effective slots require an additional 2,880 inactive satellites in orbits between the active arcs. The total number of satellites therefore required to provide the maximum number of slots in accordance with the preferred embodiment is 5,760. Although it may not be economically feasible to totally fill "cobra space" with satellites in accordance with the preferred embodiment, the preceding discussion illustrates the significant increase in worldwide satellite capacity that can be achieved by employing the invention described herein. Compared to the 180 slots available in the geostationary ring, the number of effective slots according to the present invention represents a sixteen-fold increase. As suggested by FIG. 10, the satellites in adjacent ground tracks "fly in formation", maintaining the spacing between them. In effect, the satellites in the active arc former a rectangular grid that moves slowly across the sky. In an alternative embodiment, illustrated in FIG. 12, the mean anomalies of satellites 132 and 134 in adjacent ground tracks are adjusted to staggered the positions of the satellites in the formation, and hence achieve either greater spacing between satellites in the adjacent ground tracks or allow the ground tracks to be positioned even closer together than the five degree longitudinal separation used in the preferred embodiment.

It should be noted that, unlike satellites in the geostationary ring, satellites according to the preferred embodiment must be added in increments of six, filling three slots equally spaced around the world. However, for the reasons earlier discussed, the cost of constructing and launching the six satellites in a basic array should compare favorably with that of three geo satellites providing equivalent global services.

Figure 13:
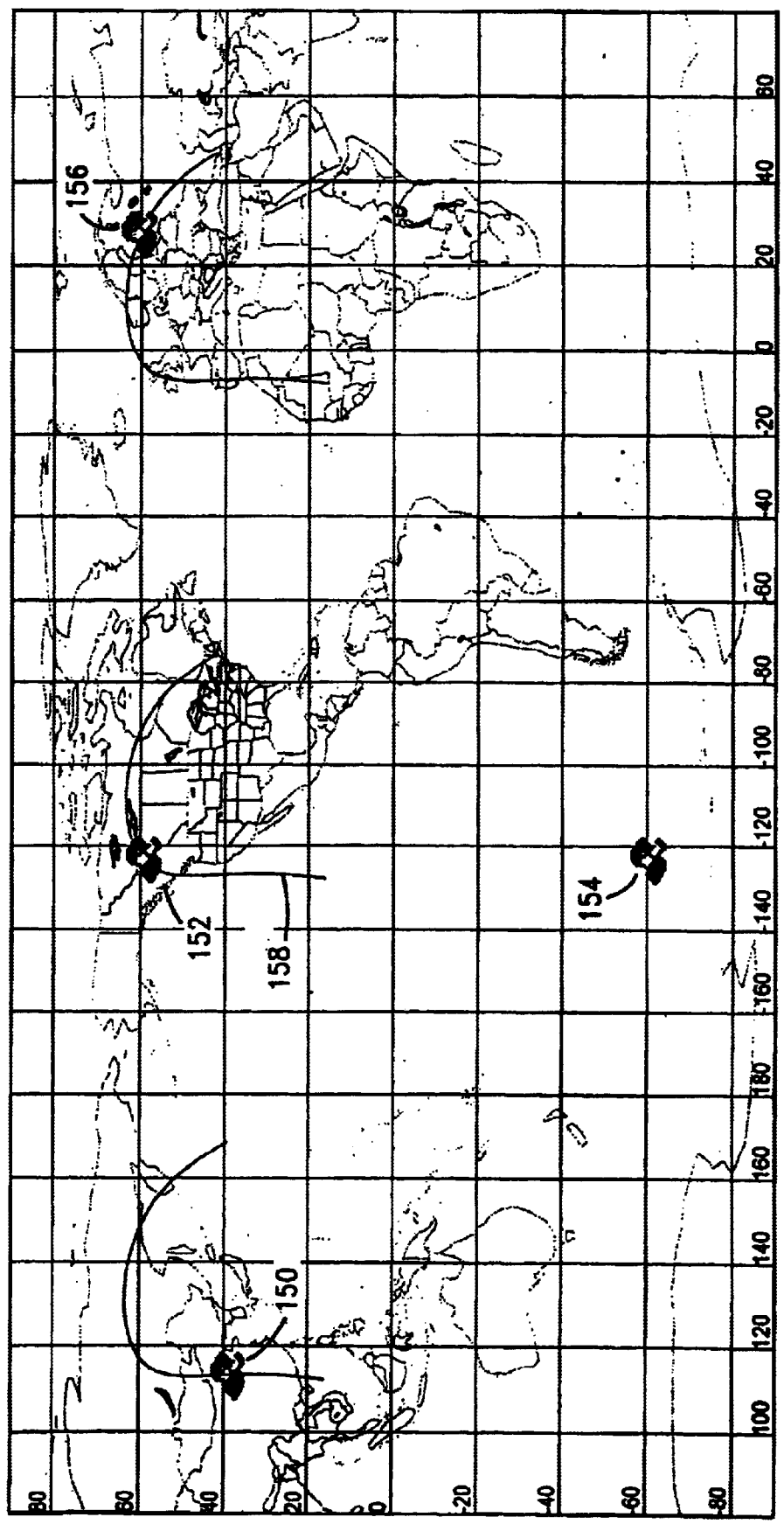
FIG. 13 is a Cartesian plot showing an array of four satellites with a 75% duty cycle according to the present invention.

The system of the present invention with leaning elliptical orbits has been optimized in the preferred embodiment to maximize the number of effective orbital slots. It should be apparent to one skilled in the art that the orbital parameters of the inventive system can be varied to emphasize other performance factors that may be desirable, such as duty cycle. By way of example, FIG. 13 illustrates another embodiment having a basic array of only four satellites 150, 152, 154, 156 in a common ground track, spaced evenly in mean anomaly, and having a 75 percent duty cycle. To achieve this result, the argument of perigee has been adjusted to be closer to 270 degrees than in the preferred embodiment, such that the active arc in this case includes the highest point in latitude.

FIG. 13 shows that an additional ground track could be inserted between the loops of ground track shown without having the active arcs cross each other. Even if the active arcs do cross, it may be possible to phase the passage of the satellites through the crossing points to maintain the desired inter-satellite spacing.

All elliptical orbits, including those described herein are subject to effects of long-term perturbations, which if not compensated, cause the desired satellite coverage to drift off with the passage of time. These perturbation effects result from the earth's J2 rotation harmonic, which reflects the fact that the earth is not a perfect sphere, but actually bulges at the equator. The two principal effects are regression of the line of nodes for posigrade orbits (I>90 degrees), and rotation of the line of apsides. For inclinations greater than critical (I between 63.4 degrees and 116.6 degrees) the line between the perigee and the apogee for each satellite (the line of apsides) will regress; for other inclinations (I<63.4 degrees or >116.6 degrees) the line of apsides will progress. At exactly the critical angles of 63.4 degrees or 116.6 degrees, the line of apsides will remain stable, a very desirable effect which is used to advantage in the preferred embodiment for maintaining apogee at a selected latitude. For inclined elliptical orbits there will be a regression of the line of nodes that must be compensated by a small adjustment in orbital period. All the satellites in a given array design are affected similarly. The effect is to cause the plane of the orbit to rotate clockwise as seen looking down on the North Pole. If that happens, the satellite would pass over a selected meridian at a slightly earlier time each day. Fortunately this effect can be compensated by slightly decreasing the period of each satellite in the array to effectively stretch out the trajectory ground track and cause the ground track to repeat exactly over the life of the satellite.

Figure 14A:
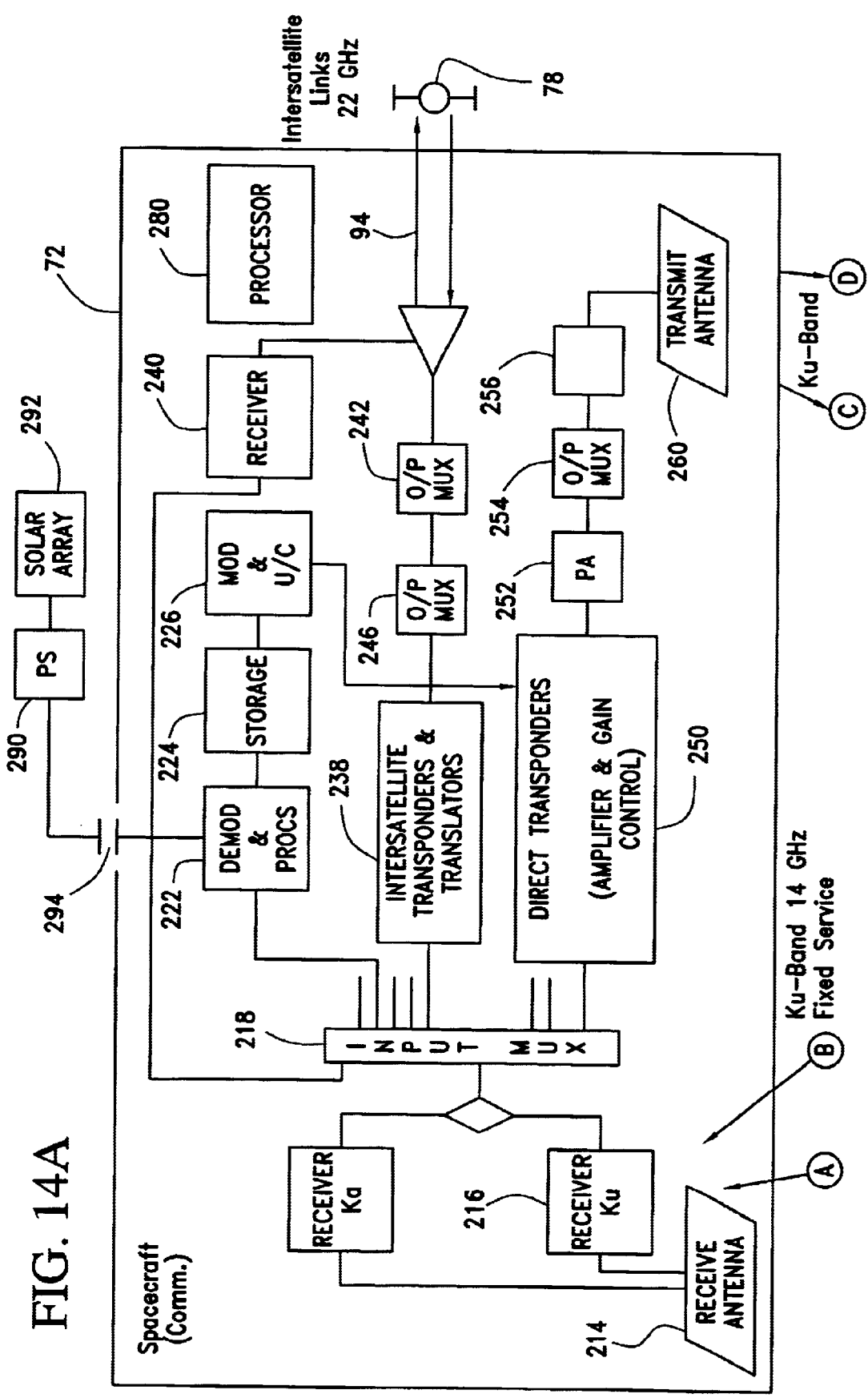
FIGS. 14A–14B is are block diagrams showing a layout of typical satellite and ground station communications equipment used according to the present invention.
Figure 14B:
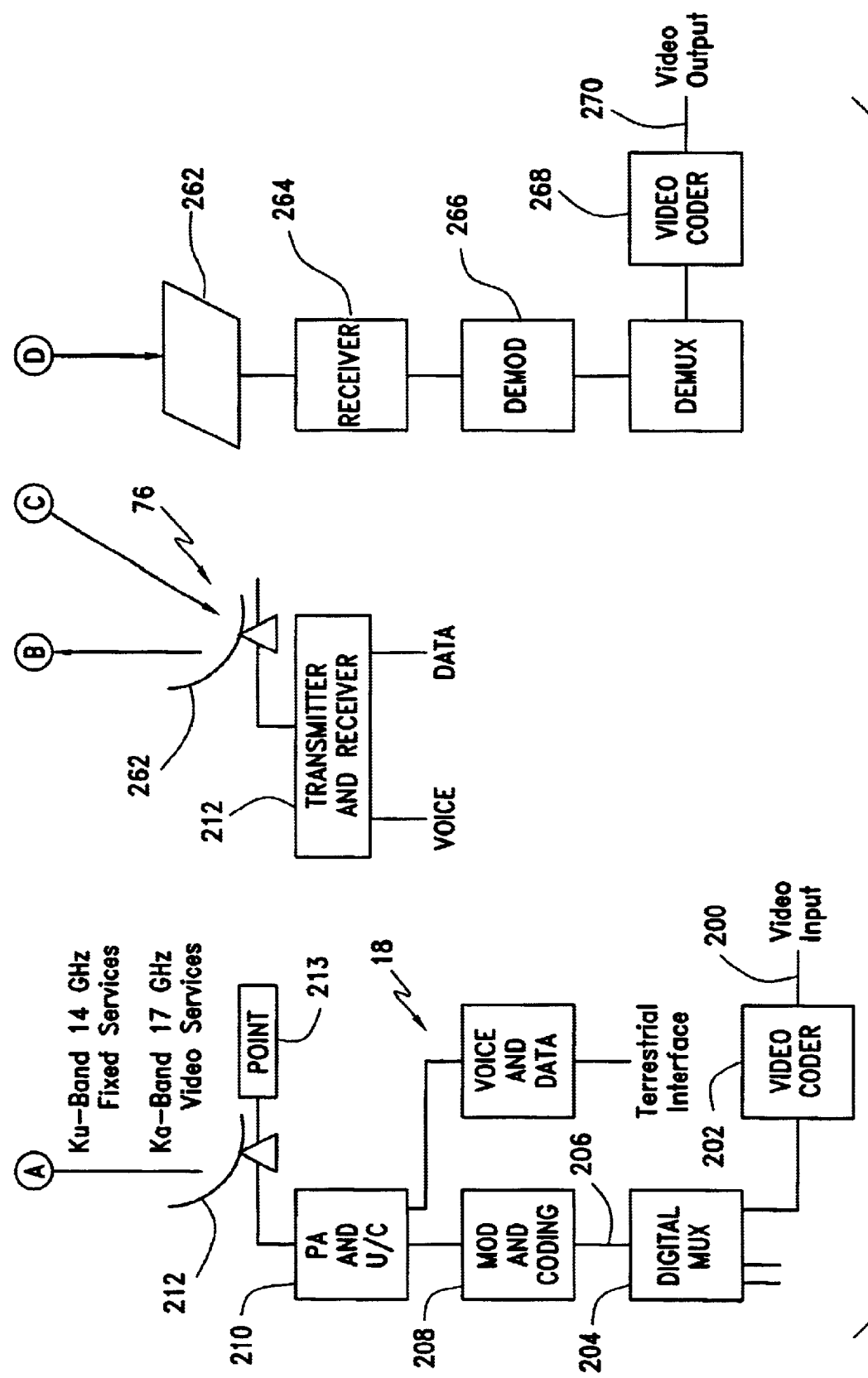

As will be apparent to a person of skill in the art, the system of the present invention has applicability to a broad variety of satellite communications services, including telephone, broadband data, television distribution, direct broadcasting and mobile communications, and to non-communications services as well, such as meteorology and earth resources monitoring. FIGS. 14A–14B provide, by way of example, block diagrams of the satellite and ground stations that can be used for television distribution and data transmission services in accordance with the present invention. The block diagrams show elements that can be used, for example, to carry out communication between the ground station 74, satellite 72, and ground station 76 of FIG. 6. In addition, the elements shown can support the inter-satellite link 94 as shown from satellite 72 to satellite 78.

Referring to FIG. 14B, the video input to be distributed is received as video input 200, and input to a video coder 202 which processes digital coded video information. This digital coded video is multiplexed with a number of other channels of video information by video multiplexer 204. The resultant multiplexed video 206 is modulated and appropriately coded by element 208 and then up converted by transmitter element 210. The up-converted signal is transmitted in the Ku band, at around 14 GHz, by antenna 212. Antenna 212 is pointed at satellite bb and is controlled by pointing servos 213.

Referring now to FIG. 14A, the transmission from antenna 212 is received by phased array antenna 214 of satellite 72. The received signal is detected by receiver 216, from which it is input to multiplexer 218. Multiplexer 218 also receives information for the into satellite transponders 238. The output of multiplexer 218 feeds the direct transponders 250, which through power amplifier 252 and multiplexer 254 feeds beam former 256. Beam former 256 drives a transmit, steerable phased array antenna 260 which transmits a signal in a current geo frequency band to steerable antenna 262 in the remote user terminal 76, of FIG. 14B. This signal preferably uses the same frequency that utilized by current geo satellites for such services. The phased array antenna 260 is steered by an on-board computer that follows a preset and repeating path, or from the ground. At user terminal 76 in FIG. 14B, the signal is received by receiver 264 through steerable antenna 262, demodulated at 266, and decoded at 268 to produce the video output 270. In the alternative, user terminal 76 may include transmitter and receiver 212 capable of two-way transmission of voice and data.

Referring again to FIG. 14A, satellite 72 includes another input to multiplexer 218 from the inter-satellite link 26 via receiver 240. Transmit information for inter-satellite link 94 is multiplexed at 242 and amplified at 246 prior to being multiplexed.

Still referring to FIG. 14A, output 222 of input multiplexer 218 represents a storage output. The satellite electronics include the capacity for one-hour of TV program information. The TV channels typically produced information that the rate of 6 megabytes per second. The channels are typically digitally multiplexed to produce information on four to six channels at time. Therefore the present invention preferably uses 22 gigabytes of storage for over one hour of information at about 4.7 megabytes per second. The information stored can then be broadcast over another active arc. The storage unit 224, accordingly, is a wide SCSI-2 devise capable of receiving 4.7 megabytes per second and storing 22 gigabytes. Upon appropriate satellite command, the output of storage unit 224 is modulated and up-converted at 226.

In addition, FIG. 14A depicts an on-board processor 280, which determines the position in the orbit and steering of the satellite antennas from various parameters. Power supply 290 supplies and regulates electrical power for all the various satellite subsystems and components that require such power. Power supply 290 includes a source of power, here shown as solar array 292, and an energy storage element, here showed as a battery array 294. Importantly, according to the present invention, the solar array 292 is sized to provide an amount of power that is less than that required to fully power the satellite communications functions of the satellite, the fraction being referred to herein as the power ratio of the satellite. The power ratio depends on the kind of orbit that satellites will have, and how long the satellites will be transmitting during the elliptical orbit. The preferred embodiment of the present invention has a power ratio of 0.5, to power satellite that is communicating half of the time. The other half of the time, the transmitters and receivers on-board the satellite are disabled, allowing solar array 292 to provide power to charge battery 294. Employment of the inventive system provides a new standard with greatly increasing the number of the world's communications satellites, with no interference to any geo satellites, and also no interference to each other. A total of 5,760 virtual Geo satellites will provide 2880 active slots. This will increase by sixteen-fold the 180 2-degree slots that are currently available in the geo ring. As such, the method and system of the present invention can be utilized to improve the elliptical satellite orbits described in the prior art to dramatically increase available communication capacity.

While this invention has been described in reference to illustrative embodiments, the description is not intended to be construed in a limiting sense. Various modifications and combinations of the illustrative embodiments, as well as other embodiments of the invention, will be apparent to persons skilled in the art upon reference to the description. It is therefore intended that the appended claims encompass any of such modifications or embodiments.

What is claimed is:

1. A satellite communications system, comprising:
   a ground station, including communications equipment and an antenna, located at a position on the earth;
   a plurality of satellites in orbits around the earth having apogees and perigees, each of the satellites having communications equipment thereon configured to communicate with the ground station only during a predetermined portion of the satellite's orbit proximate to apogee, the orbits of the plurality of satellites being configured to form at least two ground tracks on the earth displaced from each other longitudinally, each of the ground tracks repeating daily and having a number of active arcs, each active arc corresponding to the portion of the orbit of each satellite during which the communications equipment on the satellite is enabled to communicate with the ground station, the orbits of the plurality of satellites being further configured such that at all times there are at least two of the satellites in each of the active arcs and such that at all times each of the satellites in any one of the active arcs is separated by at least a predetermined angle, as observed from the ground station, from each other satellite in the same active arc and from any satellite in any other active arc.

2. A system according to claim 1, wherein the orbit of each of the plurality of satellites has a mean motion that is one of 2, 3 and 4.

3. A system according to claim 1, wherein the orbits of each of the plurality of satellites is inclined at critical inclination.

4. A system according to claim 1, wherein the argument of perigee of the orbits of each of the plurality of satellites is in the range of 195 degrees to 345 degrees for apogees in the northern hemisphere and in the range of 15 degrees to 165 degrees for apogees in the southern hemisphere.

5. A system according to claim 1, wherein each of the plurality of satellites has throughout its orbit an orbital height lower than a height necessary for geostationary orbits.

6. A system according to claim 1, wherein the plurality of satellites are equally spaced in mean anomaly within their respective ground tracks.

7. A system according to claim 1, wherein the orbits of the plurality of satellites are further configured such that the portion of the orbits during which the communications equipment on the satellites is enabled to communicate, is separated from the equatorial plane of the earth by at least a predetermined amount.

8. A system according to claim 1, wherein the communications equipment on the plurality of satellites is further configured to communicate at frequencies allocated to geostationary satellites.

9. A system according to claim 1, wherein each of the plurality of satellites has a power system configured to generate a first amount of power when the communications equipment on the satellite is enabled and a second amount of power more than the first amount of power when the communications equipment is not enabled, to store excess power generated when the communications equipment is not enabled, and to enable the communications equipment with both the stored excess power and the generated first amount of power.

10. A constellation of satellites, comprising:
    a plurality of satellites in orbits around the earth having apogees and perigees, each of the satellites having communications equipment thereon configured to communicate only during a predetermined portion of the satellite's orbit proximate to apogee, the orbits of the plurality of satellites being configured to form at least two ground tracks on the earth displaced from each other longitudinally, each of the ground tracks repeating daily and having a number of active arcs, each active arc corresponding to the portion of the orbit of each satellite during which the communications equipment on the satellite is enabled to communicate, the orbits of the plurality of satellites being further configured such that at all times there are at least two of the satellites in each of the active arcs and such that at all times each of the satellites in any one of the active arcs is separated by at least a predetermined angle, as observed from the earth, from each other satellite in the same active arc and from any satellite in any other active arc.

11. A constellation according to claim 10, wherein the orbit of each of the plurality of satellites has a mean motion that is one of 2, 3 and 4.

12. A constellation according to claim 10, wherein the orbit of each of the plurality of satellites is inclined at critical inclination.

13. A constellation according to claim 10, wherein the argument of perigee of the orbits of each of the plurality of satellites is in the range of 195 degrees to 345 degrees for apogees in the northern hemisphere and in the range of 15 degrees to 165 degrees for apogees in the southern hemisphere.

14. A constellation according to claim 10, wherein each of the plurality of satellites has throughout its orbit a orbital height lower than a height necessary for geostationary orbits.

15. A constellation according to claim 10, wherein the satellites in each of the two or more ground tracks are equally spaced in mean anomaly.

16. A constellation according to claim 10, wherein the orbit of each of the plurality of satellites is further configured such that the portion of the orbits during which the communications equipment on the satellites is enabled to communicate, is separated from the equatorial plane of the earth by a least a predetermined amount.

17. A constellation according to claim 10, wherein the communications equipment on each of the plurality of satellites is further configured to communicate at frequencies allocated to geostationary satellites.

18. A constellation according to claim 10, wherein each of the plurality of satellites has a power system configured to generate a first amount of power when the communications equipment on the satellite is enabled and a second amount of power more than the first amount of power when the communications equipment is not enabled, to store excess power generated when the communications equipment is not enabled, and to enable the communications equipment with both the stored excess power and the generated first amount of power.

19. A method for satellite communications, comprising:

orbiting a plurality of communications satellites about the earth, the orbits having apogees and perigees; and enabling each of the plurality of communications satellites to communicate only during a predetermined portion of the orbits proximate to apogee;

wherein the orbits of the plurality satellites form at least two ground tracks on the earth displaced from each other longitudinally, each of the ground tracks repeating daily and having a number of active arcs, each active arc corresponding to the portion of the orbit of each satellite during which the communications equipment on the satellite is enabled to communicate; and wherein the satellites are orbited such that at all times at least two of the satellites are in each of the active arcs and such that at all times each of the satellites in any one of the active arcs is separated by at least a predetermined angle, as observed from the earth, from each other satellite in the same active arc and from any satellite in any other active arc.

20. A method according to claim 19, further comprising:

configuring the orbits of each of the plurality of satellites to have a mean motion that is one of 2, 3 and 4.

21. A method according to claim 19, further comprising:

configuring the orbits of each of the plurality of satellites to be inclined at critical inclination.

22. A method according to claim 19, further comprising:

configuring the argument of perigee of the orbits of each of the plurality of satellites to be in the range of 195 degrees to 345 degrees for apogees in the northern hemisphere and in the range of 15 degrees to 165 degrees for apogees in the southern hemisphere.

23. A method according to claim 19, further comprising:

configuring the orbits of each of the plurality of satellites to have throughout its orbit an orbital height lower than a height necessary for geostationary orbits.

24. A method according to claim 19, further comprising:

configuring the orbits of the plurality of satellites such that the satellites are equally spaced in mean anomaly within their respective ground tracks.

25. A method according to claim 19, further comprising:

configuring the orbits of the plurality of satellites such that the portion of the orbits during which the satellites are enabled for communication, is separated from the equatorial plane of the earth by at least a predetermined amount.

26. A method according to claim 19, further comprising:

communicating with the plurality of satellites at frequencies allocated to geostationary satellites.

27. A method according to claim 19, wherein each of the plurality of satellites has a power system generating a first amount of power when the communications equipment on the satellite is enabled and a second amount of power more than the first amount of power when the communications equipment is not enabled, and further comprising:

storing excess power generated when the communications equipment is not enabled; and enabling the communications equipment with both the stored excess power and the generated first amount of power.

* * * * *

(12) EX PARTE REEXAMINATION CERTIFICATE (6250th)
United States Patent
Draim

(10) Number: US 6,701,126 C1
(45) Certificate Issued: Jun. 10, 2008

(54) SYSTEM AND METHOD FOR IMPLEMENTING A CONSTELLATION OF NON-GEOSTATIONARY SATELLITES THAT DOES NOT INTERFERE WITH THE GEOSTATIONARY SATELLITE RING

(75) Inventor: John E. Draim, Vienna, VA (US)

(73) Assignee: Space Resource International, Ltd., Washington, DC (US)

Reexamination Request:
No. 90/007,974, Mar. 18, 2006

Reexamination Certificate for:
Patent No.: 6,701,126
Issued: Mar. 2, 2004
Appl. No.: 09/709,280
Filed: Nov. 13, 2000

(51) Int. Cl.
*H04B 7/185* (2006.01)
*H04B 7/19* (2006.01)
*G05D 1/08* (2006.01)
*B64G 1/00* (2006.01)
*B64G 1/24* (2006.01)
*B64G 1/10* (2006.01)

(52) U.S. Cl. .................. 455/13.1; 455/12.1; 455/13.2; 455/427

(58) Field of Classification Search .................. None
See application file for complete search history.

(56) References Cited

U.S. PATENT DOCUMENTS 6,695,260 B2 * 2/2004 Castiel et al. ............ 244/158.4
6,954,613 B1  10/2005 Castiel et al.
7,184,761 B1 * 2/2007 Wang .......................... 455/427

FOREIGN PATENT DOCUMENTS

EP    0886392 A2    12/1998

* cited by examiner

*Primary Examiner*—Joseph R Pokrzywa

(57) ABSTRACT

Provided is an improved system and method for implementing a constellation of satellites in inclined elliptical orbits. The satellites are operated during the portion of their orbits near apogee to emulate the characteristics of geostationary satellites. The orbits are configured to form a number of closely spaced repeating ground tracks around the earth. In each ground track the satellites operate only in arcs well above or below the equator to provide a large number of non-geostationary orbital slots that substantially increase global satellite capacity without interfering with the existing geostationary satellite ring. Minimum spacing is maintained between satellites in each active arc and between satellites in the active arcs of adjacent ground tracks to ensure that the satellites in the non-geostationary constellation do not interfere with each other.

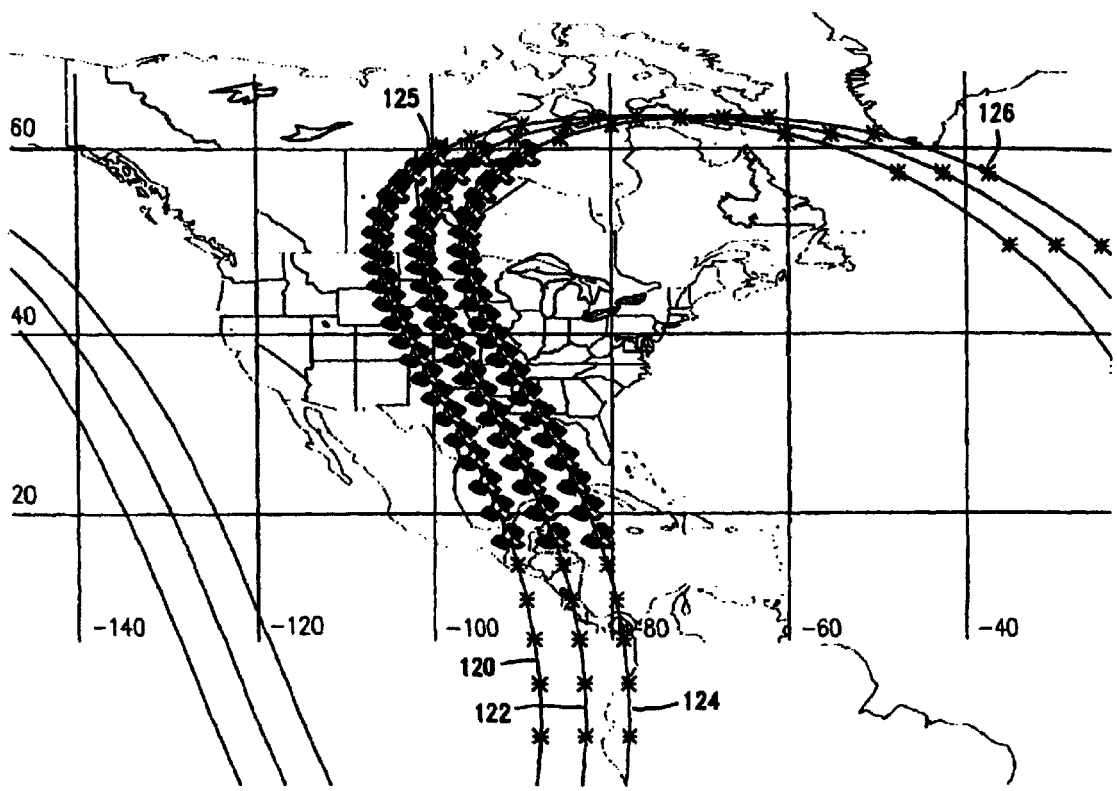

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 12, line 31:

FIG. 9 illustrates the method, according to the present invention, for increasing the number of available satellite slots by adding additional ground tracks displaced from each other by a small longitudinal increment, which in the preferred embodiment shown is five degrees. [The] *As discussed above, the east-west orientation of the active arcs in the prior art virtual geo satellite system, shown in FIG. 5, limits the minimum longitudinal increment between multiple ground tracks. It can be understood from FIG. 5 that the minimum longitudinal increment for spacing multiple ground tracks in the prior art virtual geo satellite system must be greater in value than the angular length, as measured from one end to the other end, of each of the active arcs, in order to prevent the active arcs in adjacent ground tracks from overlapping and the satellites from potentially interfering with each other. On the other hand, the* nearly north-south orientation of the active arcs in the present invention makes it possible to pack ground tracks closer together, *at a longitudinal increment that is significantly smaller than the angular length of each of the active arcs,* without having the active arcs overlap, and, therefore, without incurring potential interference between satellites in the adjacent ground tracks. For the sake of clarity, FIG. 9 shows only one of the loops of three adjacent ground tracks, 120, 122, 124 in detail with the 40 satellites, both active and inactive, in the loop. In the active arc between 15.4 and 60 degrees north latitude the satellites are bunched together and moving information along the tracks.

AS A RESULT OF REEXAMINATION, IT HAS BEEN DETERMINED THAT:

Claims 4, 13 and 22 are cancelled.

Claims 1, 10 and 19 are determined to be patentable as amended.

Claims 2, 3, 5–9, 11, 12, 14–18, 20, 21 and 23–27, dependent on an amended claim, are determined to be patentable.

1. A satellite communications system, comprising:
a ground station, including communications equipment and an antenna, located at a position on the earth;
a plurality of satellites in *non-geosynchronous, elliptical* orbits around the earth having apogees and perigees, each of the satellites having communications equipment thereon configured to communicate with the ground station only during a predetermined portion of the satellite's orbit proximate to apogee, the orbits of the plurality of satellites being configured to form at least two ground tracks on the earth *having the same shape and size and* displaced from each other longitudinally, each of the ground tracks repeating daily and having a number of active arcs, each active arc *having an angular length* corresponding to the portion of the orbit of each satellite during which the communications equipment on the satellite is enabled to communicate with the ground station, the orbits of the plurality of satellites being further configured such that at all times there are at least two of the satellites in each of the active arcs, *such that the active arcs have a nearly north-south orientation, such that the longitudinal displacement between a first one of the ground tracks and a second one of the ground tracks is less than the angular length of each of the active arcs,* and such that at all times each of the satellites in any one of the active arcs *of the first one of the ground tracks* is separated by at least a predetermined angle, as observed from the ground station, from each other satellite in the same active arc and from any satellite in [any other] *an adjacent* active arc *of the second one of the ground tracks, wherein the argument of perigee of the orbits of each of the plurality of satellites is in one of the ranges of 195 degrees to 255 degrees and 285 to 345 degrees for apogees in the northern hemisphere and in one of the ranges of 15 degrees to 75 degrees and 105 degrees to 165 degrees for apogees in the southern hemisphere.*

10. A constellation of satellites, comprising:
a plurality of satellites in *non-geosynchronous, elliptical* orbits around the earth having apogees and perigees, each of the satellites having communications equipment thereon configured to communicate only during a predetermined portion of the satellite's orbit proximate to apogee, the orbits of the plurality of satellites being configured to form at least two ground tracks on the earth *having the same shape and size and* displaced from each other longitudinally, each of the ground tracks repeating daily and having a number of active arcs, each active arc *having an angular length* corresponding to the portion of the orbit of each satellite during which the communications equipment on the satellite is enabled to communicate, the orbits of the plurality of satellites being further configured such that at all times there are at least two of the satellites in each of the active arcs, *such that the active arcs have a nearly north-south orientation, such that the longitudinal displacement between a first one of the ground tracks and a second one of the ground tracks is less than the angular length of each of the active arcs,* and such that at all times each of the satellites in any one of the active arcs *of the first one of the ground tracks* is separated by at least a predetermined angle, as observed from the earth, from each other satellite in the same active arc and from any satellite in [any other] *an adjacent* active arc *of the second one of the ground tracks, wherein the argument of perigee of the orbits of each of the plurality of satellites is in one of the ranges of 195 degrees to 255 degrees and 285 to 345 degrees for apogees in the northern hemisphere and in one of the ranges of 15 degrees to 75 degrees and 105 degrees to 165 degrees for apogees in the southern hemisphere.*

19. A method for satellite communications, comprising:
orbiting a plurality of communications satellites about the earth *in non-geosynchronous,* [the] *elliptical* orbits having apogees and perigees; and
enabling each of the plurality of communications satellites to communicate only during a predetermined portion of the orbits proximate to apogee;

wherein the orbits of the plurality satellites form at least two ground tracks on the earth *having the same shape and size and* displaced from each other longitudinally, each of the ground tracks repeating daily and having a number of active arcs, each active arc *having an angular length* corresponding to the portion of the orbit of each satellite during which the communications equipment on the satellite is enabled to communicate; and wherein the satellites are orbited such that at all times at least two of the satellites are in each of the active arcs, *such that the active arcs have a nearly north-south orientation, such that the longitudinal displacement between a first one of the ground tracks and a second one of the ground tracks is less than the angular length of each of the active arcs,* and such that at all times each of the satellites in any one of the active arcs *of the first one of the ground tracks* is separated by at least a predetermined angle, as observed from the earth, from each other satellite in the same active arc and from any satellite in [any other] *an adjacent* active arc *of the second one of the ground tracks, and further comprising: configuring the argument of perigee of the orbits of each of the plurality of satellites to be in one of the ranges of 195 degrees to 255 degrees and 285 to 345 degrees for apogees in the northern hemisphere and in one of the ranges of 15 degrees to 75 degrees and 105 degrees to 165 degrees for apogees in the southern hemisphere.*

\* \* \* \* \*